(12) United States Patent
Wang et al.

(10) Patent No.: US 12,235,541 B2
(45) Date of Patent: Feb. 25, 2025

(54) BACKLIGHT MODULE, METHOD FOR MANUFACTURING THE SAME, AND DISPLAY APPARATUS

(71) Applicants: Hefei BOE Ruisheng Technology Co., Ltd., Anhui (CN); BOE Technology Group Co., Ltd., Beijing (CN)

(72) Inventors: Xiao Wang, Beijing (CN); Bing Zhang, Beijing (CN); Liang Gao, Beijing (CN); Qi Qi, Beijing (CN); Jiwei Sun, Beijing (CN)

(73) Assignees: HEFEI BOE RUISHENG TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/274,726

(22) PCT Filed: Jul. 28, 2022

(86) PCT No.: PCT/CN2022/108730
§ 371 (c)(1),
(2) Date: Jul. 28, 2023

(87) PCT Pub. No.: WO2024/020957
PCT Pub. Date: Feb. 1, 2024

(65) Prior Publication Data
US 2025/0004323 A1     Jan. 2, 2025

(51) Int. Cl.
G02F 1/00        (2006.01)
G02F 1/1335      (2006.01)
G02F 1/13357     (2006.01)

(52) U.S. Cl.
CPC .. *G02F 1/133603* (2013.01); *G02F 1/133605* (2013.01); *G02F 1/133612* (2021.01)

(58) Field of Classification Search
None
See application file for complete search history.

(56) References Cited

U.S. PATENT DOCUMENTS 10,644,091 B2    5/2020   Liu et al.
2012/0057099 A1*  3/2012  Tanuma ............... G02B 6/0073
                                                         362/97.3

(Continued)

FOREIGN PATENT DOCUMENTS

CN     102376209 A    3/2012
CN     104703388 A    6/2015

(Continued)

*Primary Examiner* — Gerald J Sufleta, II
(74) *Attorney, Agent, or Firm* — XSENSUS LLP

(57) ABSTRACT

A backlight module includes a substrate provided with a light-emitting region and a bonding region, a plurality of light-emitting units disposed on a side of the substrate, a back plate disposed on the other side of the substrate, and at least three drive circuit boards bonded and connected to the bonding region by first connectors. Moreover, an extension direction of a long edge of each of the light-emitting units is not parallel to a bonding edge of the bonding region. In this way, when the back plate is a curved back plate, the risk of peeling of the light-emitting units from the substrate when the back plate is in a curved state can be reduced by flexibly setting the degree of the included angle between the extension direction of each long edge of each light-emitting unit and the bonding edge of the bonding region.

20 Claims, 13 Drawing Sheets

(56) References Cited

U.S. PATENT DOCUMENTS

| | | | |
|---|---|---|---|
| 2012/0105763 A1* | 5/2012 | Takeuchi | G02F 1/133615 |
| | | | 362/249.02 |
| 2015/0227172 A1 | 8/2015 | Namkung et al. | |
| 2016/0088726 A1 | 3/2016 | Jeon | |
| 2017/0318677 A1 | 11/2017 | Jeon | |
| 2019/0237689 A1 | 8/2019 | Liu et al. | |
| 2019/0302529 A1* | 10/2019 | Zha | G02F 1/133528 |
| 2021/0124216 A1 | 4/2021 | Zhu et al. | |
| 2021/0335762 A1 | 10/2021 | Liu et al. | |
| 2021/0405279 A1 | 12/2021 | Wei | |
| 2022/0093540 A1* | 3/2022 | Zhang | H01L 25/167 |
| 2022/0137463 A1* | 5/2022 | Qin | G02F 1/133612 |
| | | | 362/97.3 |
| 2022/0148530 A1 | 5/2022 | Chou | |
| 2022/0365392 A1 | 11/2022 | Liu | |
| 2022/0404666 A1 | 12/2022 | Zhang et al. | |
| 2024/0159955 A1* | 5/2024 | Tian | G02B 6/0078 |
| 2024/0274763 A1* | 8/2024 | Dong | G02F 1/1336 |

FOREIGN PATENT DOCUMENTS

| | | |
|---|---|---|
| CN | 105448252 A | 3/2016 |
| CN | 108155218 A | 6/2018 |
| CN | 109143685 A | 1/2019 |
| CN | 109613758 A | 4/2019 |
| CN | 110376790 A | 10/2019 |
| CN | 110379322 A | 10/2019 |
| CN | 110610929 A | 12/2019 |
| CN | 111221181 A | 6/2020 |
| CN | 111446349 A | 7/2020 |
| CN | 111999936 A | 11/2020 |
| CN | 112309884 A | 2/2021 |
| CN | 112331090 A | 2/2021 |
| CN | 214098032 U | 8/2021 |
| CN | 215578551 U | 1/2022 |

* cited by examiner

BACKLIGHT MODULE, METHOD FOR MANUFACTURING THE SAME, AND DISPLAY APPARATUS

CROSS-REFERENCE TO RELATED APPLICATION

This application is a US national stage of international application No. PCT/CN2022/108730, filed on Jul. 28, 2022, the disclosures of which are incorporated herein by reference in its entirety.

TECHNICAL FIELD

The present disclosure relates to the field of display technologies, and in particular, relates to a backlight module, a method for manufacturing the same, and a display apparatus.

BACKGROUND OF THE INVENTION

A backlight module is an indispensable part of a display device. At present, the backlight module generally includes: a substrate, a plurality of light-emitting units disposed on a side of the substrate, a back plate disposed on a side of the substrate, and a drive circuit board disposed on a side of the back plate further away from the substrate. The drive circuit board may be bonded and connected to the substrate by a connector and is configured to light up the plurality of light-emitting units on the substrate.

However, when the back plate is a curved back plate, the structure (for instance, the drive circuit board) in the current backlight module is prone to peeling due to the curved state, resulting in poor product yield.

SUMMARY OF THE INVENTION

A backlight module, a method for manufacturing the same, and a display apparatus are provided, with the technical solutions as follows:

In one aspect, a backlight module is provided. The backlight module includes:
- a substrate, wherein the substrate is provided with a light-emitting region and a bonding region which are arranged sequentially in a first direction;
- a plurality of light-emitting units, wherein the plurality of light-emitting units are disposed on a side of the substrate and are in the light-emitting region, each of the plurality of light-emitting units is rectangular, an orthographic projection of each of the plurality of light-emitting units on the substrate includes two opposite long edges and two opposite short edges, an extension direction of a long edge of each of the plurality of light-emitting units intersects with a bonding edge, which is a side edge of the substrate where the bonding region is provided;
- a back plate disposed on the other side of the substrate where the light-emitting units are not provided;
- a plurality of first connectors, wherein the plurality of first connectors are arranged at intervals in a second direction, one end of each of the plurality of first connectors is bonded and connected to the bonding region, and the second direction intersects with the first direction;
- at least three drive circuit boards, wherein the at least three drive circuit boards are arranged at intervals in the second direction, and each of the drive circuit boards is bonded and connected to the other ends of at least two of the plurality of first connectors; and
- a plurality of second connectors, wherein the plurality of second connectors are arranged at intervals in the second direction, and every two adjacent drive circuit boards are coupled by one of the plurality of second connectors.

Optionally, the back plate is a curved back plate, and a radius of curvature of the curved back plate is between 700 mm and 2000 mm.

Optionally, an orthographic projection of each of the plurality of light-emitting units on the substrate is rectangular, and the substrate is rectangular; and
- an included angle between the extension direction of the long edge of each of the plurality of light-emitting units and the bonding edge is greater than or equal to a target degree and is less than or equal to 90 degrees, and the target degree is a degree of an included angle between a diagonal of the rectangular substrate and the bonding edge.

Optionally, the included angle between the extension direction of the long edge of each of the plurality of light-emitting units and the bonding edge is 90 degrees, and the plurality of light-emitting units are arranged in an array.

Optionally, the at least three drive circuit boards are arranged at equal intervals.

Optionally, the bonding region is divided into at least three bonding subregions in the second direction; and
- wherein a number of the bonding subregions is the same as a number of the plurality of first connectors, and each of the at least three drive circuit boards is bonded and connected to a corresponding bonding subregion by at least one of the plurality of first connectors.

Optionally, the backlight module includes four drive circuit boards, and each of the four drive circuit boards is connected to a target number of adjacent first connectors connected to the bonding region, and the target number is greater than or equal to 1.

Optionally, the backlight module further includes a plurality of package structures in one-to-one correspondence to the plurality of light-emitting units;
- each of the plurality of package structures is disposed on a side of a corresponding light-emitting unit further away from the substrate and covers the light-emitting unit, and a length to height ratio of each of the plurality of package structures is greater than or equal to a first ratio, and is less than or equal to a second ratio; and
- wherein an orthographic projection of each of the plurality of package structures on the substrate is circular, a length of each of the plurality of package structures is a diameter of a contact surface between the package structure and the substrate, and a height of each of the plurality of package structures is a distance between an apex of the package structure further away from the substrate and the substrate.

Optionally, the first ratio is 1 and the second ratio is 4.5.

Optionally, the length of each of the plurality of package structures is 2 mm, and the height of each of the plurality of package structures is 0.5 mm.

Optionally, a surface of the package structure further away from the substrate is an arc surface.

Optionally, a material of the plurality of package structures includes a high-thixotropy protective adhesive material, and the material of the plurality of package structures is a transparent material.

Optionally, the backlight module further includes a reflective layer;

the reflective layer is disposed on the side of the substrate and is provided with a plurality of openings in one-to-one correspondence to the plurality of light-emitting units, each of the plurality of light-emitting units is disposed in a corresponding opening, and an orthographic projection of each of the plurality of openings on the substrate is disposed in an orthographic projection of one package structure on the substrate, and an edge of each of the plurality of package structures is disposed on a side of the reflective layer further away from the substrate; and wherein a material of the reflective layer and the material of the package structures are homogeneous materials.

Optionally, the material of the reflective layer and the material of the package structures are both silicon-based resin materials.

Optionally, the material of the reflective layer includes white ink.

Optionally, the at least three drive circuit boards include a printed circuit board; the plurality of first connectors each include a chip on film bonding member; and the plurality of second connectors include a flexible flat cable.

Optionally, the plurality of light-emitting units are sub-millimeter light-emitting diodes or micro light-emitting diodes.

Optionally, the first direction and the second direction are perpendicular to each other.

In another aspect, a method for manufacturing a backlight module is provided for manufacturing of the backlight module as defined in the above aspect. The method includes:

providing a substrate, wherein the substrate is provided with a light-emitting region and a bonding region, which are arranged sequentially in a first direction;

forming a plurality of light-emitting units on a side of the substrate and in the light-emitting region, wherein each of the plurality of light-emitting units is rectangular, an orthographic projection of each of the plurality of light-emitting units on the substrate includes two opposite long edges and two opposite short edges, and an extension direction of a long edge of each of the plurality of light-emitting units intersects with a bonding edge, which is a side edge of the substrate where the bonding region is provided;

fixing a back plate to the other side of the substrate where the plurality of light-emitting units are not provided;

forming a plurality of first connectors that are arranged at intervals in a second direction, and bonding and connecting one end of each of the plurality of first connectors to the bonding region, wherein the second direction intersects with the first direction;

forming at least three drive circuit boards that are arranged at intervals in the second direction, and bonding and connecting each of the at least three drive circuit boards to the other ends of at least two of the plurality of first connectors; and forming a plurality of second connectors that arranged at intervals in the second direction, and coupling every two adjacent drive circuit boards by one of the plurality of second connectors.

In still another aspect, a display apparatus is provided. The display apparatus includes: a power supply assembly, and the backlight module as defined in the above aspect, wherein the power supply assembly is coupled to the backlight module and is configured to supply power to the backlight module.

BRIEF DESCRIPTION OF DRAWINGS

To describe the technical solutions in the embodiments of the present disclosure more clearly, the following briefly introduces the accompanying drawings to be used in the description of the embodiments. Obviously, the accompanying drawings in the following description show merely some embodiments of the present disclosure, and a person of ordinary skills in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
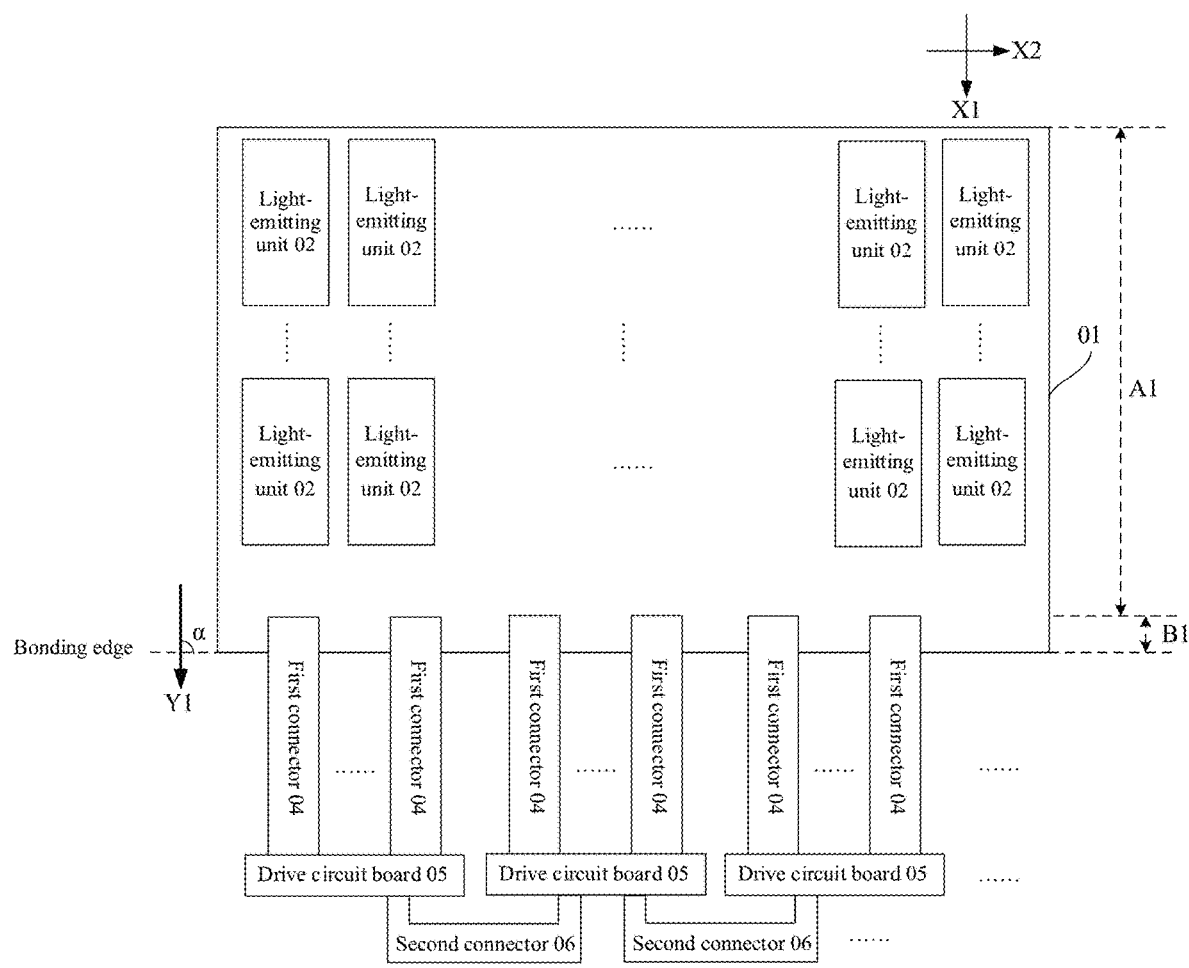
FIG. 1 is a schematic structural diagram of a backlight module according to an embodiment of the present disclosure.

FIG. 1 is a schematic structural diagram of a backlight module according to an embodiment of the present disclosure. As shown in FIG. 1, the backlight module includes a substrate 01.

The substrate 01 is provided with a light-emitting region A1 and a bonding region B1, which are arranged sequentially in a first direction X1.

The backlight module further includes a plurality of light-emitting units 02. The plurality of light-emitting units 02 are disposed on a side of the substrate 01 and in the light-emitting region A1. Each light-emitting unit 02 is rectangular, the orthographic projection of each light-emitting unit on the substrate 01 may include two opposite long edges and two opposite short edges; and an extension direction Y1 of the long edge of each light-emitting unit 02 and a bonding edge are intersected, i.e., unparallel. As shown in FIG. 1, the bonding edge is a side edge of the substrate 01 where the bonding region B1 is provided.

Figure 2:
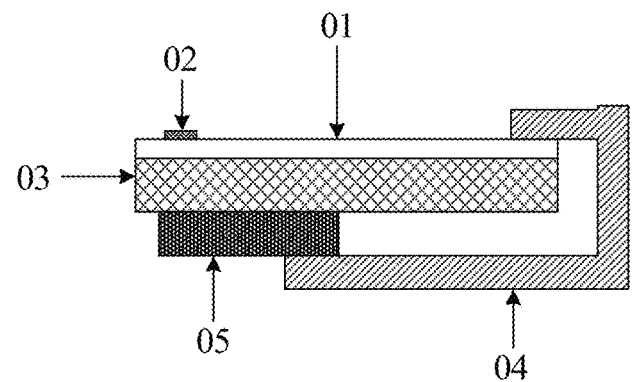
FIG. 2 is a schematic structural diagram of another backlight module according to an embodiment of the present disclosure.

Based on FIG. 1, referring to FIG. 2, it can be seen that the backlight module described in the embodiment of the present disclosure further includes a back plate 03. The back plate 03 is disposed on a side of the substrate 01 where no light-emitting unit 02 is disposed.

Based on the positions for providing of the substrate 01 and the back plate 03, it can be seen that the back plate 03 may be configured for carrying and fixing the substrate 01 to improve the mechanical strength of the substrate and keep the substrate in a specific state. The plurality of light-emitting units 02 on the substrate 01 may be lighted up to emit light. The substrate 01 may be fixed to the back plate 03 by an adhesive layer.

It should be noted that the plurality of light-emitting units 02 may be provided on one surface of the substrate 01 by a die bonding process. In order to improve the die bonding efficiency, the extension direction Y1 of the long edge of the light-emitting unit 02 is currently parallel to the bonding edge. However, in this arrangement, when a curved back plate is equipped with (that is, the back plate 03 is of a curved structure having a fixed curvature), electrodes of the light-emitting units 02 will inevitably be subjected to a stress, and the greater the stress, the smaller the thrust of the light-emitting units 02. In this way, the electrodes of the light-emitting units 02 are separated from a bonding pad on the substrate 01, thereby causing the light-emitting units 02 to peel from the substrate 01.

The stress refers to a force generated in an object, when the object is deformed due to an external cause (for instance, an external bending force generated when the back plate 03 is in a curved state), and the force resists this external cause and tries to return the object from a position after deformation to a position before the deformation. The thrust represents the strength and firmness of the connection between an object and other components in contact therewith, and the greater the thrust, the stronger and firmer, the connection between the object and other components in contact therewith. After testing, it is found that, according to the arrangement (where the extension direction Y1 of the long edge of each light-emitting unit 02 is parallel to the bonding edge) of the relevant technology, the electrode (whether positive or negative) of a light-emitting unit 02 closest to an edge region of the back plate is subjected to the maximum stress, which may reach $1*10^7$ N/square meter (N/m$^2$), such that the thrust of the light-emitting unit 02 here is small.

In an embodiment of the present disclosure, when the substrate 01 provided with the plurality of light-emitting units 02 is equipped with a curved back plate, the stresses on the electrodes of the light-emitting units 02 can be effective reduced by making the extension direction Y1 of long edge of each light-emitting unit 02 to be unparallel with the bonding edge and by flexibly adjusting the degree of an included angle α between the extension direction Y1 of the long edge and the bonding edge, thereby improving the thrust of the light-emitting units 02 and avoiding breakage and peeling of the electrodes of the light-emitting units 02. That is, the risk of peeling of the light-emitting units 02 can be reliably reduced.

Still referring to FIG. 1 and FIG. 2, it can be seen that the backlight module described in an embodiment of the present disclosure further includes: a plurality of first connectors 04, at least three drive circuit boards 05, and a plurality of second connectors 06.

The plurality of first connectors 04 are arranged at intervals in a second direction X2, and one end of each of the plurality of first connectors 04 is bonded and connected to the bonding region B1. The second direction X2 and the first direction X1 are intersected, i.e., unparallel. The second direction X2 shown in FIG. 1 is perpendicular to the first direction X1.

The at least three drive circuit boards 05 are arranged at intervals in the second direction X2, and each drive circuit board 05 is bonded and connected to the other ends of at least two of the first connectors 04. That is, the at least three drive circuit boards 05 may be bonded and connected into the bonding region B1 by the plurality of first connectors 04.

Optionally, in an embodiment of the present disclosure, the bonding region B1 of the substrate 01 may include a plurality of bonding electrodes (not shown in the drawings) that are arranged at intervals in the second direction X2. Ends of the plurality of first connectors 04 may be bonded and connected to some of the bonding electrodes in the bonding region B1 of the substrate 01, and the drive circuit boards 05 may be bonded and connected to the plurality of bonding electrodes in the bonding region B1 of the substrate 01 by at least two of the first connectors 04.

Moreover, every two adjacent drive circuit boards 05 are coupled by one second connector 06. That is, a plurality of second connectors 06 may be arranged at intervals in the second direction X2.

Signals may be transmitted between the drive circuit boards 05 by the second connectors 06. Each drive circuit board 05 may transmit signals to the bonding region B1 by the first connectors 04, and the signals transmitted to the bonding region B1 may be used to light up the plurality of light-emitting units 02 provided on one side of the substrate 01.

It should be noted that, the backlight module in the related art includes only one drive circuit board 05 or at most two drive circuit boards in order to save costs and improve assembly efficiency. However, when a curved back plate is implemented based on this structure, it is necessary to provide the drive circuit boards 05 on the side of the substrate 01 where the light-emitting units 02 are not provided. That is, the bending radius of the first connector 04 is large, and the first connection 04 is subjected to more stresses. In this way, the first connectors 04 are prone to separate from the bonding region B1, that is, the first connectors 04 have a greater risk of peeling. Moreover, in order to ensure that the positions of the drive circuit boards 05 in the curved state remain unchanged (i.e., equivalently in a planar state) as much as possible, in a case that a small number of drive circuit boards 05 are provided, an end of each drive circuit board 05 closer to a position of the back plate 03, where the degree of bending is largest, has a greater distance from the back plate 03. Accordingly, at this position where the distance is greater, a required length of the first connector 04 which bonds and connects the drive circuit board 05 to the bonding region B1 is larger. The length here refers to the overall length of the first connector 04 (i.e., the length from one end to the other end of the first connector 04). Furthermore, affected by the curved state, the distance between each drive circuit board 05 and the back plate 03 is large (that is, a large gap exists), in a case that a small number of drive circuit boards 05 are provided, thereby also causing that an overall thickness of the backlight module is larger.

In an embodiment of the present disclosure, three or more drive circuit boards 05 are provided. When a curved back plate is implemented, each drive circuit board 05 is closer to the back plate 03, and the first connector 04 does not need bending a larger angle, that is, the bending radius can be smaller. For instance, in some embodiments, the bending radius of the first connector 04 may be equivalent to the bending radius of each first connector 04 in a case that a planar back plate is implemented (in combination with FIG. 3, the bending radius here refers to the length of bending of the first connector 04 from its end which bonds and connects the drive circuit board 05 to the other end which bonds and connects the bonding region B1). In this way, the stress on the first connector 04 can be reduced, the separation of the first connector 04 from the bonding region B1 can be avoided, and the risk of peeling of the first connector 04 can be reduced. Moreover, compared with the prior art, since more drive circuit board 05 are provided, the end of each drive circuit board 05 closer to the position of the back plate 03 where the degree of bending is largest has a smaller distance from the back plate 03. Accordingly, a required length of the first connector 04 which bonds and connects the drive circuit board 05 to the bonding region B1 may be smaller. Furthermore, in the curved state, the distance between each drive circuit board 05 and the back plate 03 is smaller compared with the prior art. That is, a smaller gap may exist. In this way, it can also be ensured that the overall thickness of the backlight module can be small. That is, the overall thickness of the backlight module can be reduced.

In summary, the embodiment of the present disclosure provides a backlight module. The backlight module includes a substrate provided with a light-emitting region and a bonding region, a plurality of light-emitting units disposed on a side of the substrate, a back plate disposed on the other side of the substrate, and at least three drive circuit boards bonded and connected to the bonding region by first connectors. Moreover, an extension direction of a long edge of each of the plurality of light-emitting units is not parallel to a bonding edge of the bonding region. Thus, in a case that the back plate is a curved back plate, the risk that the light-emitting units peel from the substrate when the back plate is in a curved state can be reduced by setting the degree of the included angle between the extension direction of the long edge of the light-emitting unit and the bonding edge of the bonding region, i.e., the arrangement fashion of the light-emitting units. Moreover, when the back plate is in the curved state, the risk that the first connectors peel from the bonding region, i.e., the risk that the drive circuit boards are disconnected from the bonding region, can be reduced by providing a plurality of drive circuit boards. Each structure in the backlight module provided in the embodiment of the present disclosure is not prone to peeling, and the product yield is improved.

Optionally, as described in the above embodiment, the back plate 03 may be a curved back plate, and the curvature of the curved back plate may be between 700 mm$^{-1}$ to 2000 mm$^{-1}$, for instance, 1500 mm$^{-1}$. The curvature is generally used as a standard measure of a curved back plate to indicate the degree of bending. A display product with the curved back plate may also be called a curved display. Compared with a traditional flat panel display, the curved display is more in line with the physiological curvature of human eyes, and can greatly improve the sense of wrapping and immersion when users watch it, such that the users can enjoy better visual experience when playing games, watching movies or doing daily office work.

Optionally, the light-emitting unit 02 described in the embodiment of the present disclosure may be a light-emitting diode (LED). Moreover, the light-emitting diode (LED) may be a submillimeter LED, which may also be called Mini_LED, or, Micro LED.

Figure 3:
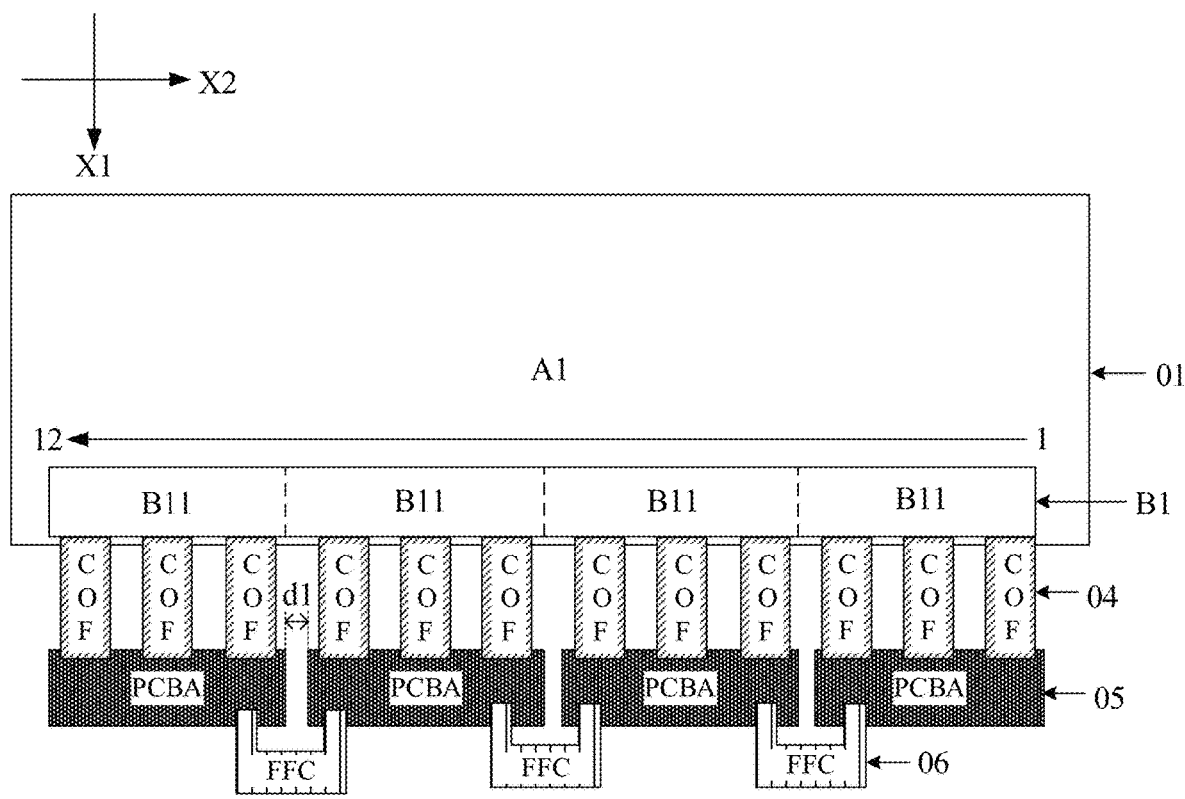
FIG. 3 is a schematic structural diagram of still another backlight module according to an embodiment of the present disclosure.

Optionally, FIG. 3 is a schematic structural diagram of still another backlight module according to an embodiment of the present disclosure. Referring to FIG. 1 to FIG. 3, it can be seen that the at least three drive circuit boards 05 described in an embodiment of the present disclosure may be arranged at equal intervals. That is, in the second direction X2, the interval d1 between every two adjacent drive circuit boards 05 may be fixed.

It should be noted that "being arranged at equal intervals" refers to the fact that at least three drive circuit boards 05 are arranged at equal intervals in a case that the curved back plate is not implemented, that is, the back plate 03 is not in a bent state. Also, the "being arranged at equal intervals" here may refer to that the drive circuit boards 05 are arranged at equal intervals, in a case that an odd number of drive circuit boards 05 are included. If an even number of drive circuit boards 05 are included, the rectangular substrate 01 in a flat state may be divided into left and right portions by a central axis in the first direction X1. The even number of drive circuit boards 05 may be symmetrically distributed on the left and right portions (that is, each portion includes the same number of drive circuit boards 05). The drive circuit boards 05 bonded and connected to the bonding region B1 in each portion may be arranged at equal intervals. That is, the interval is a fixed interval. While the interval between two closest drive circuit boards 05 disposed on the left and right portions respectively may not be the fixed interval.

Also, the bonding region B1 may be divided into at least three bonding subregions B11 in the second direction X2. The number of the bonding subregions B11 is the same as the number of the drive circuit board 05, and each drive circuit board 05 may be bonded and connected to a corresponding bonding subregion B11 by at least one of the first connectors 04.

Optionally, each bonding subregion B11 includes an equal number of bonding electrodes. Accordingly, in combination with FIG. 3, it can be considered that at least three bonding subregions B11 are arranged sequentially in the second direction X2.

Optionally, each drive circuit board 05 may be connected to a target number of adjacent first connectors 04 connected to the bonding region B1, and the target number may be greater than or equal to 1.

For instance, referring to FIG. 3, the backlight module shown includes four drive circuit boards 05. Accordingly, the bonding region B1 includes four bonding subregions B11 that are arranged sequentially in the second direction X2. Moreover, each drive circuit board 05 is bonded and connected to the corresponding bonding subregion B11 by three adjacent first connectors 04. That is, the target number is 3. Then, it can be seen that the backlight module may include 12 first connectors 04 arranged at intervals, and three second connectors 06 arranged at intervals.

Optionally, referring to FIG. 3, it can also be seen that the drive circuit board 05 described in an embodiment of the present disclosure may include a printed circuit board assembly (PCBA). The first connector 04 may each include a chip on film (COF) bonding member. The second connectors 06 may each include a flexible flat cable (FFC). Without doubt, in some other embodiments, the drive circuit board 05 may further include other types of structures, such as a flexible printed circuit (FPC). The first connector 04 may also include other types of bonding connectors; such as chip on glass (COG) bonding members. The second connectors 06 may also include other types of structures, such as conductive cables.

Figure 4:
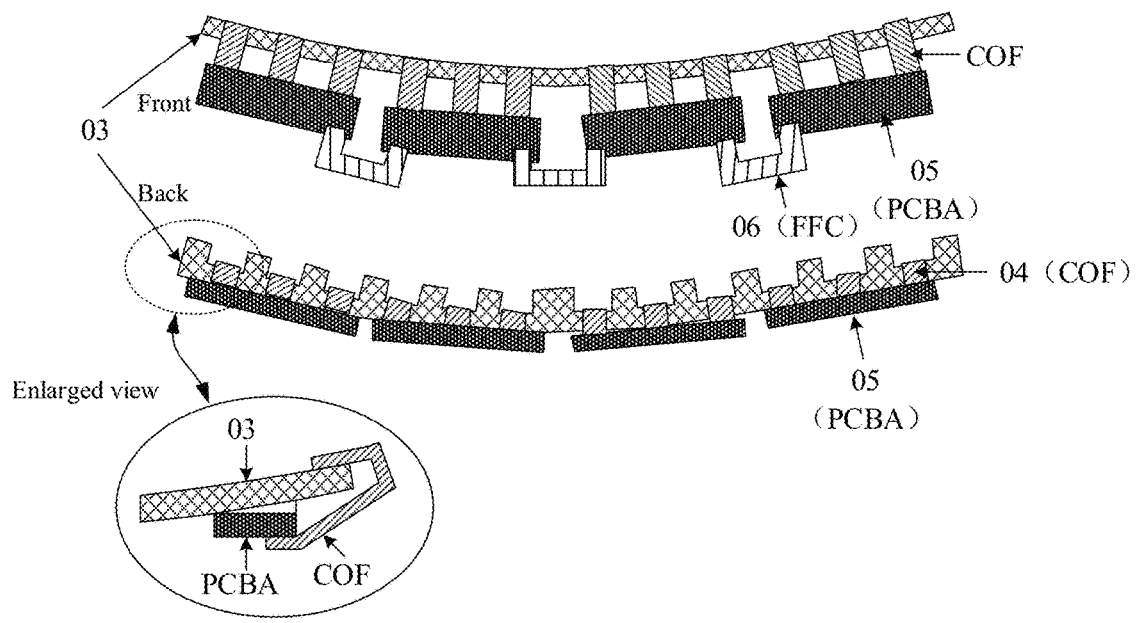
FIG. 4 is a schematic structural diagram of a portion of a backlight module according to an embodiment of the present disclosure.

Based on the structure shown in FIG. 3, FIG. 4 shows a sectional view of a partial structure of a backlight module, which includes a sectional portion observed from the back and front of the back plate 03, as well as a partially enlarged portion of an edge.

In combination with FIG. 4, in a case that four drive circuit boards 05 (for instance, PCBAs) are used, each drive circuit board 05 has similar positions before and after the back plate 03 is bent. The similar positions may refer to the fact that: a position of the drive circuit board 05 before the back plate 03 is bent (that is, the back plate 03 is not in a bent state) is similar to a position of the drive circuit board 05 after the back plate 03 is bent (that is, the back plate 03 is in a bent state). Also, as described in the above embodiment, in a case that four drive circuit boards 05 are used, after the back plate 03 is bent, the bending radius required by the first connector 04 (for instance, COF) may reach about 1.5 millimeters (mm) which approaches the bending radius of 2 mm as required by the first connector 04 when the back plate 03 is in a plane state before the back plate 03 is bent. In this way, the stress on the first connector 04 can be effectively reduced, and the risk of peeling of each first connector 04 can be reduced.

Figure 5:
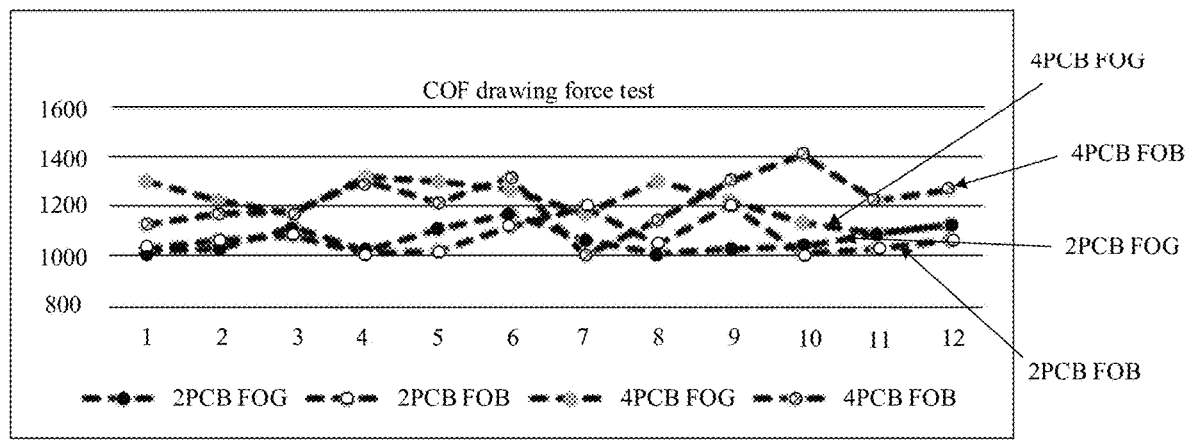
FIG. 5 is a schematic diagram of drawing force test results of a first connector according to an embodiment of the present disclosure.

Taking the structure shown in FIG. 3 as an example, a backlight module including 2 PCBAs and a backlight module including 4 PCBAs are subjected to a COF drawing force test, respectively, according to the embodiment of the present disclosure, after both of them are simultaneously stored for 30 days. A reference may be made to Table 1 and FIG. 5 below for the test results. It should be noted that due to the limitations of test equipment, the back plate 03 in each backlight module needs to be disassembled before the drawing force test, such that the substrate 01 is in a planar state. That is, the drawing force test is a test which is performed when the substrate 01 is not equipped with a curved back plate and is in a planar state. In FIG. 5, the x-coordinates indicate 12 COFs in the structure shown in FIG. 3, and the y-coordinates indicate the values of drawing force in gram force/centimeter (gf/cm). Moreover, Table 1 and FIG. 5 also show the drawing force of COF at an FOG end and an FOB end, respectively. The FOG end refers to an end where the COF is bonded to the substrate 01, and the FOB end refers to the other end where the COF is bonded to the PCBA. The drawing force refers to a resultant force of a deformation resistance overcome by an object during a drawing process and friction forces between the object and other structures. The greater the drawing force of the object, the less the stress on the object, and the lower the risk of peeling of the object.

Referring to Table 1 and FIG. 5, it can be seen that in the backlight module including 2 PCBAs, the average (Avg) drawing force of the 12 COFs at the FOG end is 1070 gf/cm; and the average drawing force of the 12 COFs at the FOB end is 1075 gf/cm. In the backlight module including 4 PCBAs, the average drawing force of the 12 COFs at the FOG end is 1223 gf/cm; and the average drawing force of the 12 COFs at the FOB end is 1225 gf/cm. The average here refers to a value acquired by dividing the sum of drawing forces of 12 COFs by 12. Based on the above test results, it can be further determined that the drawing force of each COF in the backlight module provided with 4 PCBAs is increased by about fifteen percent (15%) compared with the backlight module provided with 2 PCBAs. Then, it can be seen that the risk of peeling of the first connectors 04 can be effectively reduced by providing a backlight module including three or more drive circuit boards 05 according to the embodiment of the present disclosure.

TABLE 1

| ITEM | | 1 | 2 | 3 | 4 | 5 | 6 | 7 | 8 | 9 | 10 | 11 | 12 | Avg |
|---|---|---|---|---|---|---|---|---|---|---|---|---|---|---|
| 2PCBA | FOG | 1020 | 1030 | 1120 | 1020 | 1110 | 1170 | 1070 | 1010 | 1030 | 1040 | 1090 | 1130 | 1070 |
| | FOB | 1030 | 1070 | 1080 | 1010 | 1020 | 1120 | 1200 | 1050 | 1210 | 1010 | 1030 | 1070 | 1075 |
| 4PCBA | FOG | 1310 | 1230 | 1170 | 1320 | 1310 | 1270 | 1170 | 1310 | 1230 | 1140 | 1090 | 1130 | 1223 |
| | FOB | 1130 | 1170 | 1180 | 1310 | 1220 | 1320 | 1000 | 1150 | 1310 | 1410 | 1230 | 1270 | 1225 |

Figure 6:
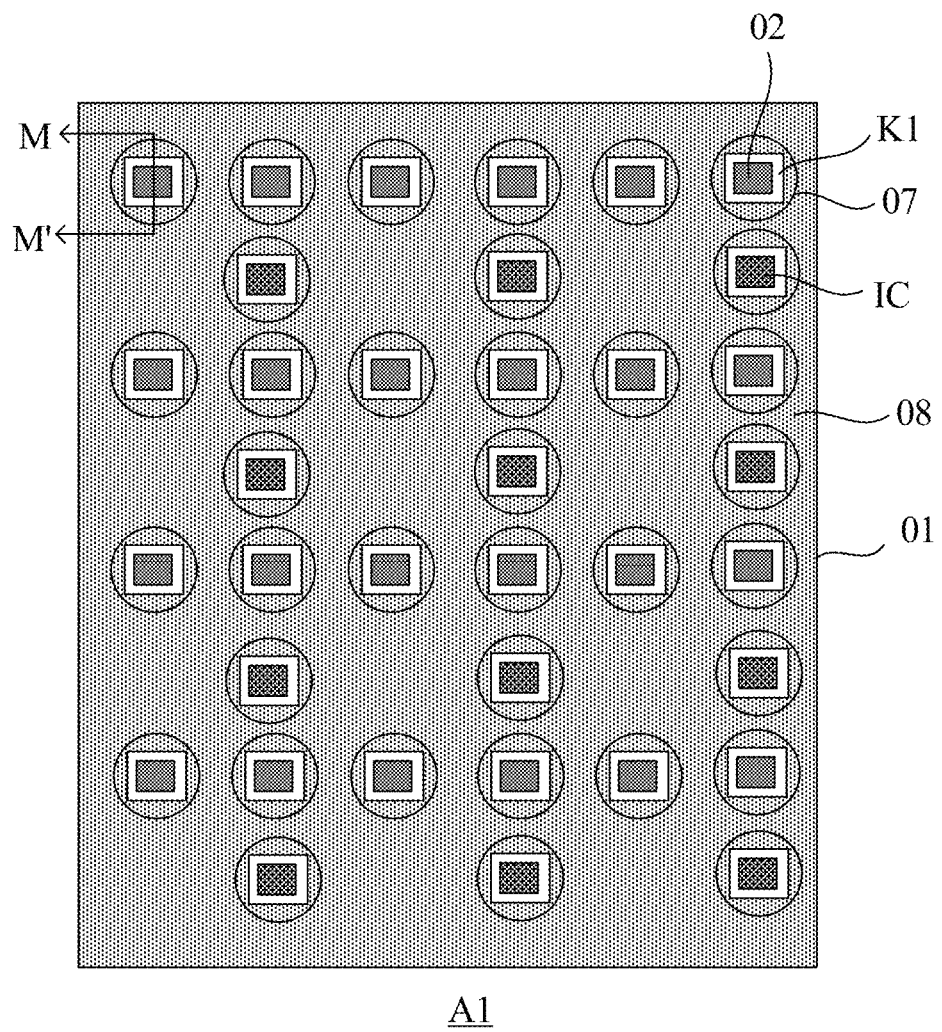
FIG. 6 is a schematic structural diagram of further another backlight module according to an embodiment of the present disclosure.
Figure 7:
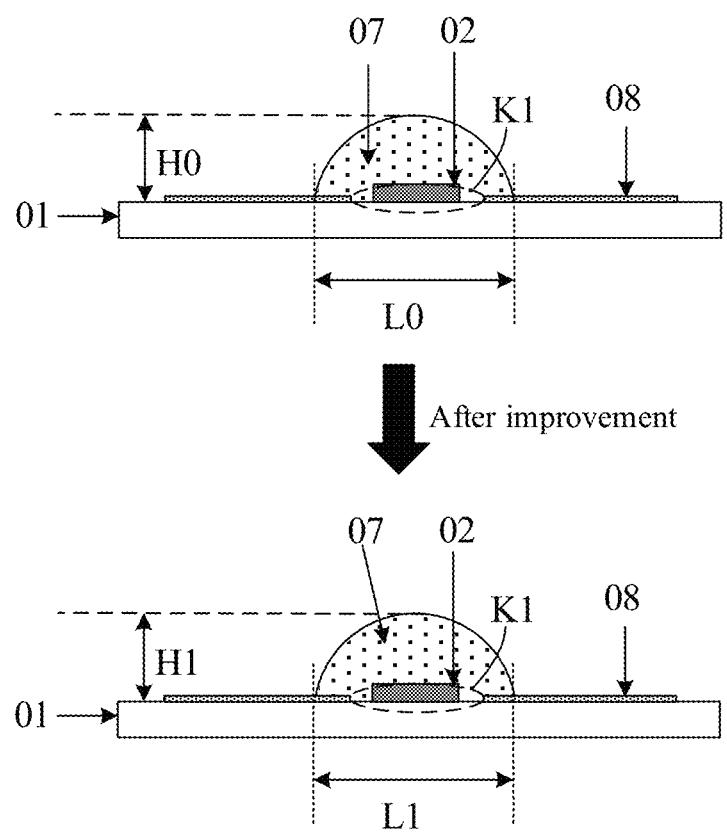
FIG. 7 is a schematic sectional view of the structure shown in FIG. 6.

Optionally, FIG. 6 is a schematic structural diagram of still another backlight module according to an embodiment of the present disclosure. FIG. 7 is a sectional view of the structure shown in FIG. 6 in the direction MM'. In combination with FIG. 6 and FIG. 7, it can be seen that the backlight module provided by the embodiment of the present disclosure may further include a plurality of package structures 07 and a reflective layer 08.

The plurality of package structures 07 are in one-to-one correspondence to the plurality of light-emitting units 02. Each package structure 07 is disposed on a side of a corresponding light-emitting unit 02 further away from the substrate 01, and covers the light-emitting unit 02. That is, an orthographic projection of each light-emitting unit 02 on the substrate 01 is within an orthographic projection of the corresponding package structure 07 on the substrate 01, and the package structure 07 protrudes toward the side further away from the light-emitting unit 02 to wrap the light-emitting unit 02. Also, the orthographic projection of each package structure 07 on the substrate 01 may be circular. Without doubt, in some other embodiments, the orthographic projection of each package structure 07 on the substrate 01 may also take other shapes, such as an oval.

The reflective layer 08 may be disposed on one side of the substrate 01, and is provided with a plurality of openings K1 that are at least in one-to-one correspondence to the plurality of light-emitting units 02. Each light-emitting unit 02 may be in a corresponding opening K1; an orthographic projection of each opening K1 on the substrate 01 may be in the orthographic projection of one of the package structures 07 on the substrate 01; and an edge of each package structure 07 may be on a side of the reflective layer 08 further away from the substrate 01. That is, the reflective layer 08 may be between the light-emitting units 02 and the package structures 07, and an orthographic projection of the edge of the package structure 07 on the substrate 01 is in an orthographic projection of the reflective layer 08 on the substrate 01. In other words, a size of the opening K1 of the reflective layer 08 may be larger than a size of the orthographic projection of the light-emitting unit 02 on the substrate 01, and may be smaller than a size of the orthographic projection of the package structure 07 on the substrate 01.

Moreover, referring to FIG. 7, it can also be seen that the surface of the package structure 07 further away from the substrate 01 is an arc surface, and the cross-section of the package structure 07 may be circular in a direction parallel to the substrate 01. The surface of the package structure 07 further away from the substrate 01 has a convex lens shape and the convex lens shape is provided on a light emergent side of the light-emitting unit 02, and the package structure 07 wraps the light-emitting unit 02. Without doubt, in some other embodiments, the cross-section of each package structure 07 may also be semicircle or polygonal or in other shapes.

In an embodiment of the present disclosure, the package structure 07 may be configured to protect the light-emitting unit 02. For instance, the package structure 07 may be configured to prevent the light-emitting unit 02 from being damaged by external water vapor invading the light-emitting unit 02, avoid the corrosion of the light-emitting unit 02, and prevent the light-emitting unit 02 from being collided by other devices on the substrate 01 or on the back plate 03. The reflective layer 08 may be configured to reflect light emitted by the light-emitting unit 02 to ensure light emergence at the light emergent side.

From the above introductions to position relationships and functions, it can be seen that, in the embodiment of the present disclosure, the material of the package structure 07 needs to be a transparent material to avoid reducing the light emergent efficiency of the light-emitting unit 02. For instance, the material of the package structure 07 may be transparent silicone. The reflective layer 08 needs to have high reflective properties. That is, it needs to be prepared from a material with high reflective properties. For instance, the material of the reflective layer 08 may include silver or white ink.

In the related art, because the extension direction Y1 of the long edge of the light-emitting unit 02 is parallel to the bonding edge, the electrode of the light-emitting unit 02 will be broken, thereby leading to the problem of peeling, and further leading to peeling of the package structures 07. By setting the extension direction Y1 of the long edge of each light-emitting unit 02 not to be parallel to the bonding edge, the risk of peeling of the package structures 07 can be reduced on the basis of reducing the risk of peeling of the light-emitting units 02.

Figure 8:
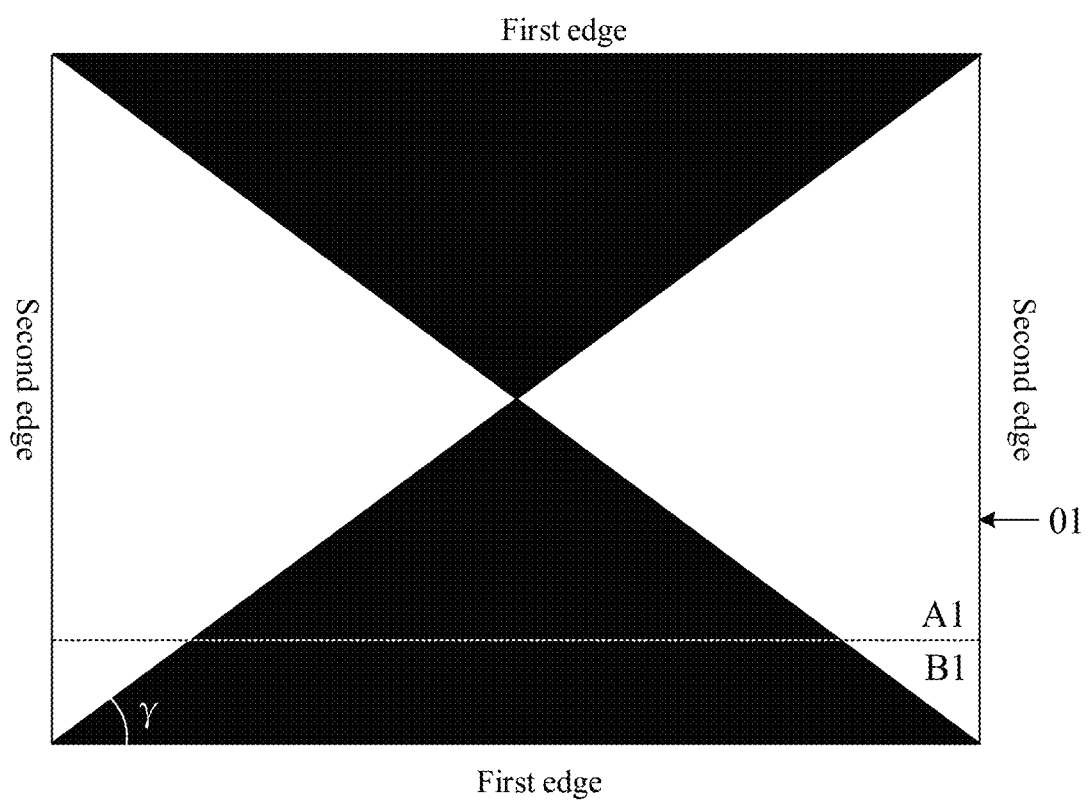
FIG. 8 is a schematic structural diagram of further another backlight module according to an embodiment of the present disclosure.

Optionally, FIG. 8 is a schematic structural diagram of still another backlight module according to an embodiment of the present disclosure. In combination with FIG. 1 and FIG. 8, it can be seen that the orthographic projection of each light-emitting unit 02 described in the embodiment of the present embodiment on the substrate 01 may be rectangular, and the substrate 01 may be rectangular.

That is, the orthographic projection of each light-emitting unit 02 on the substrate 01 may have two opposite long edges, and two opposite short edges, and the long edges are perpendicular to the short edges. The substrate 01 has two opposite first edges and two opposite second edges, and the first edges may intersect with the second edges; and the substrate 01 in the planar state may have diagonals. In a case that the first edges and the second edges are unequal in length, the substrate 01 is rectangular. In a case that the first edges and the second edges are equal in length, the substrate 01 is square.

Without doubt, in some other embodiments, the orthographic projection of each light-emitting unit 02 on the substrate 01 may also take other shapes, for example, a parallelogram. The substrate 01 may also take other shapes, for instance, a trapezoid.

In combination with FIG. 1 and FIG. 8, an included angle α between the extension direction Y1 of the long edge of each light-emitting unit 02 and the bonding edge may be greater than or equal to a target degree, and less than or equal to 90 degrees. The target degree may be the degree of an included angle γ between the diagonal of the rectangular substrate 01 in the planar state and the bonding edge. In a case that the rectangle presented by the substrate 01 is square (the first edges and the second edges are equal in length), the target degree, i.e., the degree of the included angle γ, may be 45 degrees. In a case that the rectangle presented by the substrate 01 is rectangular (the first edges and the second edges are unequal in length), the target degree, i.e., the degree of the included angle γ, is less than 90 degrees, for instance, 30 degrees. That is, the degree of the included angle α between the extension direction Y1 of the long edge of each light-emitting unit 02 and the bonding edge may be adjusted in the upper and lower triangles (the part filled with black of FIG. 8) divided from the substrate 01 shown in FIG. 8 by diagonals.

Figure 9:
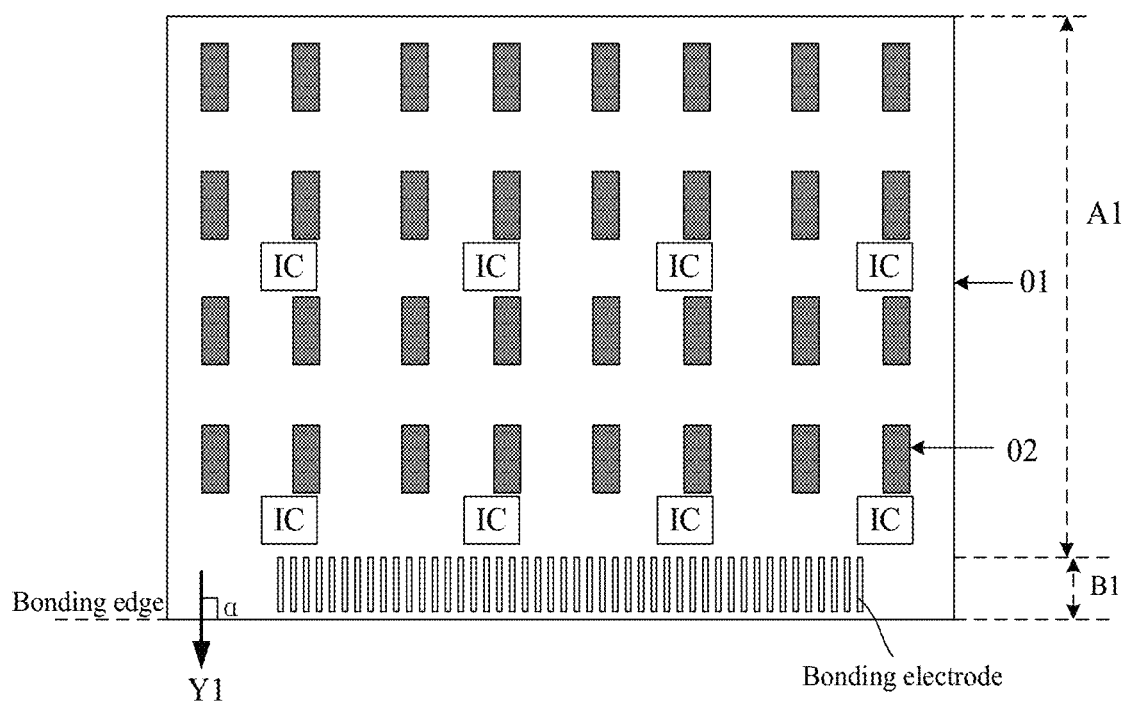
FIG. 9 is a schematic structural diagram of further another backlight module according to an embodiment of the present disclosure.

For example, referring to FIG. 1 and FIG. 9, in an embodiment of the present disclosure, the included angle α between the extension direction Y1 of each long edge of each light-emitting unit 02 and the bonding edge may be 90 degrees. That is, the extension direction Y1 of each long edge of each light-emitting unit 02 is perpendicular to the bonding edge. It is equivalent to rotation of the overall light-emitting unit 02 by 90 degrees, with respect to the current solution that the extension direction Y1 of each long edge of each light-emitting unit 02 is parallel to the bonding edge.

Moreover, the plurality of light-emitting units 02 may be arranged in an array. That is, when arranged in rows and columns as shown in FIG. 9, a plurality of rows and columns of light-emitting units 02 are included in the backlight module. Optionally, as described in the above embodiment, the first direction X1 and the second direction X2 may be perpendicular to each other. Accordingly, the first direction X1 may refer to a row direction and the second direction X2 may refer to a column direction, on the basis of the plurality of light-emitting units 02 being arranged in an array.

Furthermore, referring to FIG. 6 and FIG. 9, it can be also seen that the substrate 01 of the backlight module in an embodiment of the present disclosure may further include other electronic elements on the same side as the light-emitting units 02, for example, miniature integrated circuit (IC) chips (hereinafter referred to as drive chips) or sensor chips. The orthographic projection of each electronic element on the substrate is rectangular; the orthographic projection of each electronic element on the substrate includes two opposite long edges and two opposite short edges; and the extension direction of the long edge of each electronic element intersects with the bonding edge. Specifically, the extension direction of the long edge of each electronic element is parallel to the extension direction of the long edge of each light-emitting unit.

The drive chip may control the luminance of the light-emitting unit 02 based on signal transmitted by the drive circuit board 05 to the bonding region B1, and one drive chip may be configured to control a plurality of light-emitting units 02. Accordingly, referring to FIG. 6 and FIG. 9, the number of drive chips in the backlight module may be less than the number of light-emitting units 02.

Optionally, still in combination with FIG. 6 and FIG. 7, the drive chip may be in the opening K1 of the reflective layer 08. Also, the side of the drive chip further away from the substrate 01 may also be provided with the package structure 07, which may cover the drive chip to protect the drive chip. The orthographic projection of the drive chip on the substrate 01 may be rectangular, for example, the square as shown in FIG. 6.

Based on the configuration in FIG. 9, when a curved back plate is equipped, the stress on the electrodes of the light-emitting units 02 can be reduced, such that the thrust of the light-emitting units 02 can be improved, the risk of breakage of electrodes of the light-emitting units 02 can be reduced, and the risk of peeling of the package structures 07 can also be reduced. It should be noted that FIG. 9 also schematically shows a plurality of bonding electrodes in the bonding region B1.

Figure 10:
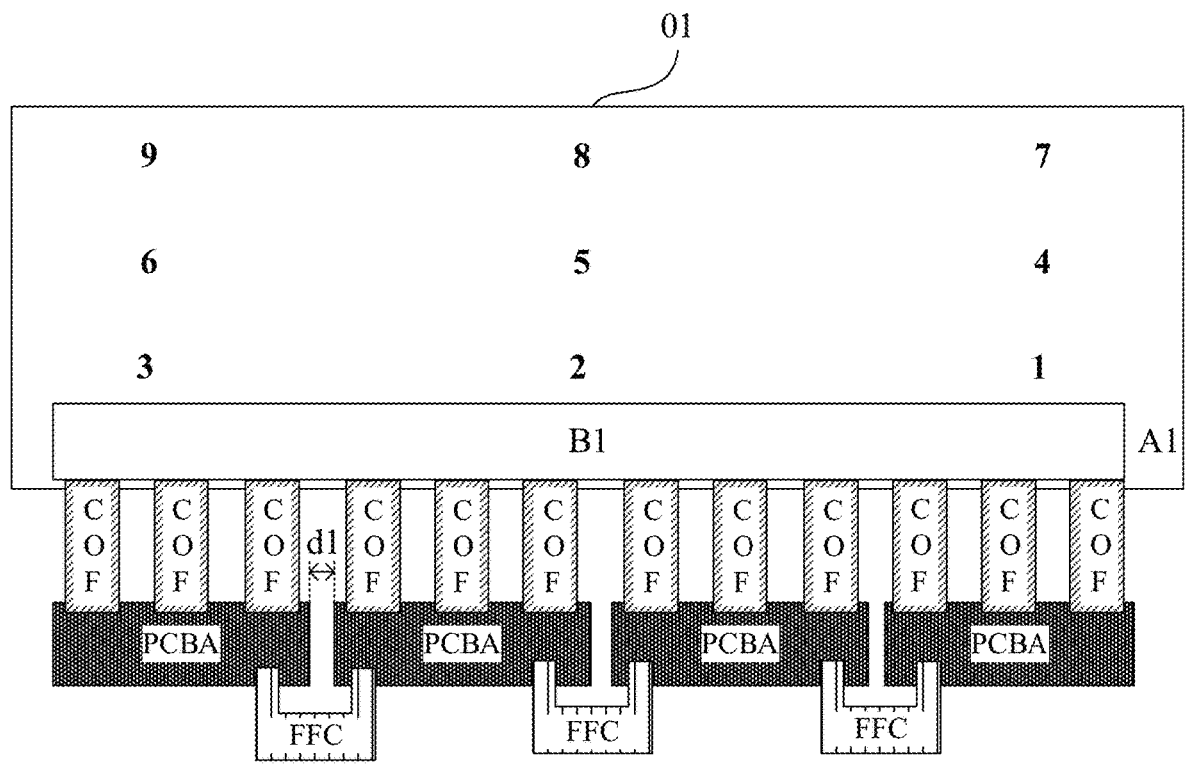
FIG. 10 is a schematic structural diagram of further another backlight module according to an embodiment of the present disclosure.

Exemplarily, taking two backlight modules including a 34-inch substrate 01 and a curved back plate 03 with a radius of curvature of 1500 mm$^{-1}$ as an example, the thrusts of the light-emitting units 02 at different positions and the thrusts of the package structures 07 on the side of the light-emitting units 02 further away from the substrate 01 are tested by subregions. For the subregions, a reference can be made to FIG. 10, 9 subregions (identified as 1 to 9 in the FIG. 10) in the light-emitting region A1 are included in total. Three sites may be tested in each subregion, with one site representing a position where one light-emitting unit 02 is provided. Accordingly, 27 sites can be tested in total. It should be noted that the 2 backlight modules tested may be 2 backlight modules randomly selected from a plurality of backlight modules produced in the same batch.

Figure 11:
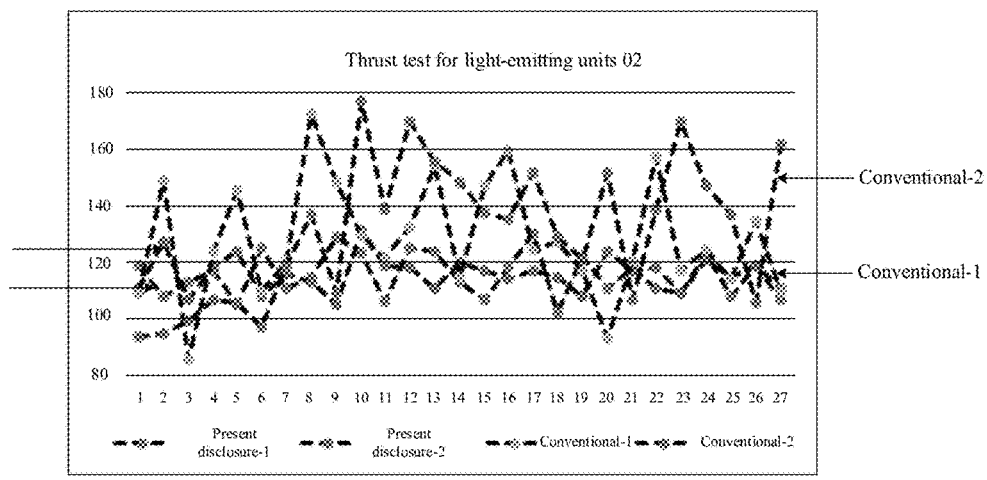
FIG. 11 is a schematic structural diagram of a thrust test for a light-emitting unit according to an embodiment of the present disclosure.
Figure 12:
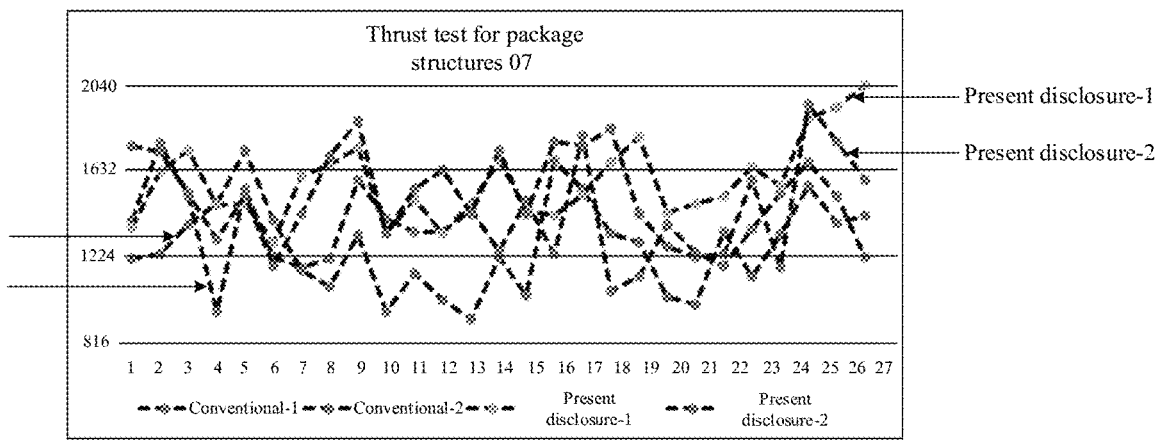
FIG. 12 is a schematic structural diagram of a thrust test for a package structure according to an embodiment of the present disclosure.

FIG. 11 shows the thrust test results of the light-emitting units 02. FIG. 12 shows the thrust test results of the package structures 07 on one side of the light-emitting units 02. Moreover, FIG. 11 and FIG. 12 show the test results of the current light-emitting units 02 with the long edges extending in the direction parallel to the bonding edge (i.e., the conventional arrangement), and the light-emitting units 02 with the long edges extending in the direction perpendicular to the bonding edge according to the embodiment of the present disclosure (i.e., the arrangement according to the embodiment of the present disclosure), respectively. "−1" and "−2" in FIG. 11 and FIG. 12 represent two backlight modules, respectively. The x-coordinates indicate the positions of 27 sites. The y-coordinates indicate the thrust in gram force (gf). Generally, the greater the thrust, the smaller the risk of peeling. Conversely, the smaller the thrust, the greater the risk of peeling.

In combination with the test results shown in FIG. 11, it can be determined that the average thrust of the light-emitting units 02 is about 115 gf under the conventional arrangement. After the light-emitting units 02 are rotated by 90 degrees according to the embodiment of the present disclosure, the average thrust of the light-emitting units 02 is about 128.75 gf. The thrust of each light-emitting unit 02 is increased by about 12%. Accordingly, the risk of peeling of the light-emitting units 02 can be effectively reduced. That is, the embodiment of the present disclosure can avoid peeling of the light-emitting units 02 by adjusting the arrangement fashion of the light-emitting units 02. For each backlight module, the average here refers to a value acquired by dividing the sum of thrusts of the package structures 02 at 27 positions by 27. Referring to the test results shown in FIG. 12, it can be determined that the average thrust of the package structures 07 is about 1322 gf under the conventional arrangement. After the light-emitting units 02 are rotated by 90 degrees according to the embodiment of the present disclosure, the average thrust of the package structures 07 is about 1564 gf. The thrust of the package structure 07 is increased by about 18%. Accordingly, the risk of peeling of the package structures 07 can be effectively reduced. That is, the embodiment of the present disclosure can avoid peeling of the package structures 07 by adjusting the arrangement fashion of the light-emitting units 02. For each backlight module, the average here refers to a value acquired by dividing the sum of thrusts of the package structures 07 at 27 positions by 27.

Optionally, FIG. 7 also identifies the length L1 and height H1 of the package structure 07. The length L1 of each package structure 07 is the diameter of a contact surface between the package structure 07 and the substrate 01. The height H1 of each package structure 07 may be a distance between an apex of the package structure 07 further away from the substrate 01 and the substrate 01.

It should be noted that, after testing, it is found that in addition to the peeling of the package structures 07 caused by the arrangement fashion of the light-emitting units 02, the package structures 07 prepared from a protective adhesive material are also prone to peeling in the curved state under the effect of the physical and chemical properties (i.e., physical properties and/or chemical properties) of the protective adhesive material. Also, under the effect of the ratio of length L1 to height H1 of the package structure 07, the package structure 07 is also prone to peeling in the curved state.

Based on this, in an embodiment of the present disclosure, the risk of peeling of the package structures 07 can also be effectively reduced by improving the material of the package structures 07, and/or, by adjusting the size of each package structure 07.

In an embodiment of improving the material of the package structures 07, a high-thixotropy protective adhesive material may be provided as the material of the package structures 07. The high-thixotropy protective adhesive material refers to a material that can "respond" to stress changes in a short time in terms of structural properties, in order to avoid peeling of the protective adhesive material due to internal stresses. The high thixotropy refers to the property of the protective adhesive material. Through the test, it is found that in a case that the protective adhesive material with high thixotropic performance is used in the package structure 07, the risk of peeling of the package structure 07 is greatly reduced when the back plate 03 is bent.

In an embodiment of adjusting the size of the package structure 07, the ratio L1/H1 of length L1 to height H1 of each package structure 07 may be set to be greater than or equal to a first ratio and less than a second ratio, in order to effectively reduce the risk of peeling of the package structure 07 and solve the problem of peeling of the package structure 07 on the premise that the optical specifications of products are not affected.

For example, the first ratio may be 1 and the second ratio may be 4.5, i.e., $1 \leq L1/H1 \leq 4.5$. For instance, assuming L1/H1=4, in combination with FIG. 7, for example, the length L1 of each package structure 07 may be set to 2.25 millimeters (mm), and the height H1 of each package structure 07 may be set to 0.5 mm. It can be understood that, during concrete implementation, the minimum design value of the length of the package structure 07 is positively related to the size of the opening K1 of the reflective layer 08. For example, the maximum size of the opening K1 of the reflective layer 08 is 1.6 mm, and the minimum design value of the length of the package structure 07 is then slightly greater than 1.6 mm. The minimum value of the length of the package structure 07 as actually acquired according to the manufacturing process is related to the viscosity of the material used in the package structure. Those skilled in the art may design and fabricate a package structure with a length-to-width ratio ranging between 1 and 4.5 according to the design requirements provided by the embodiments of the present disclosure.

In the related art, in combination with FIG. 7, each package structure 07 has the length L0 of 2.5 mm, and the height H0 is generally 0.5 mm. When the back plate 03 is in a curved state, the stress at the contact position between the package structure 07 and the substrate 01 is large, and the thrust of the package structure 07 is small, leading to peeling of the package structure 07 easily. According to the embodiment of the present disclosure, the length L1 of each package structure 07 is set to 2 mm without changing the height of the package structure 07, thereby allowing the ratio L1/H1 of length L1 to height H1 of each package structure 07 to satisfy the above size relationship, such that the stress on the contact surface between the package structure 07 and the substrate 01 is reduced in the curved state, thereby improving the thrust of the package structure 07 and reducing the risk of peeling of the package structure 07.

Figure 13:
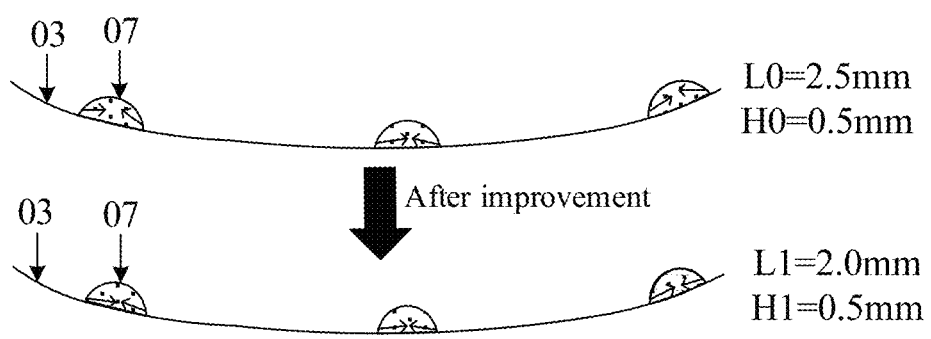
FIG. 13 is a schematic diagram of a package structure when a back plate is in a curved state according to an embodiment of the present disclosure.

Exemplarily, taking the structure of the package structure 07 before and after improvement shown in FIG. 7 as an example, FIG. 13 shows a schematic diagram of the thrust of the package structure 07 before and after the improvement. Referring to FIG. 13, the thrust is small in a case that the length L1 is set to 2 mm and the height of H1 is set to 0.5 mm, for each package structure 07. The thrust is somewhat improved in a case that the length of each package structure 07 is reduced from 2.5 mm to 2.0 mm and the height is 0.5 mm. A reference can be made to the illustration as pointed by the arrow in the figure. Based on the improved thrust, the adhesion force is increased, and it is less liable to peeling.

Figure 14:
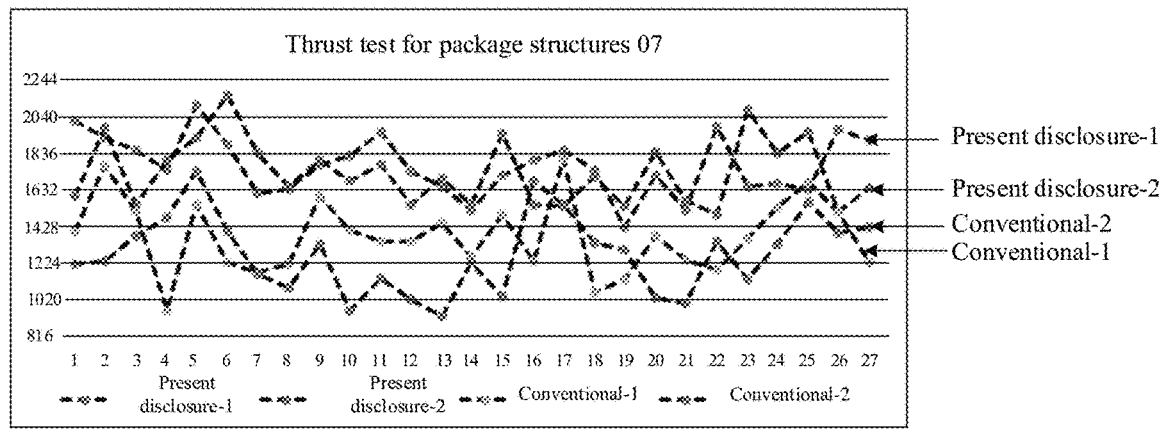
FIG. 14 is a schematic structural diagram of a thrust test for another package structure according to an embodiment of the present disclosure.

Exemplarily, still taking two backlight modules including a 34-inch substrate 01 and a curved back plate 03 with a radius of curvature of 1500 $mm^{-1}$ and the subregions in FIG. 9 as an example, the thrusts of the package structures 07 before and after adjustment of the length L1 are tested in an embodiment of the present disclosure. FIG. 14 shows the test results, and shows the thrust of the current package structure 07 having the length of 2.5 mm and the height of 0.5 mm in the 2 backlight modules, and the thrust of the package structure 07 having the length of 2.0 mm and the height of 0.5 mm in the 2 backlight modules according to the embodiment of the present disclosure, respectively. "−1" and "−2" in FIG. 14 represent two backlight modules, respectively. The x-coordinates indicate the positions of 27 sites. The y-coordinates indicate the thrusts in gf.

Referring to the test results shown in FIG. 14, it can be determined that the average thrust of the package structures 07 is about 1322 gf based on the current package structures 07 having the length L1 of 2.5 mm. After the length L1 of each package structure 07 is reduced to 2.0 mm according to the embodiment of the present disclosure, the average thrust of the package structures 07 may be improved to 1750 gf. The thrust of the package structure 07 is increased by about 32%. Accordingly, the risk of peeling of the package structures 07 can be effectively reduced. That is, the embodiment of the present disclosure can also avoid peeling of the package structures 07 by setting the size of each package structure 07 to satisfy 4≤L1/H1<5. For each backlight module, the average here refers to a value acquired by dividing the sum of thrust of the package structures 07 at 27 positions by 27.

In another aspect, after different two-phase polymers come into contact (a contact surface may be called as an interface of two phases), the energy required to reversibly separate the interface of the two-phase polymers can be called adhesion work Wa. The greater the adhesion work Wa, the tighter the adhesion of the two-phase polymers, and the less likely the peeling occurs. Based on this, the reflective layer 08 and each package structure 07 may be regarded as two-phase polymers. In order to avoid peeling between the package structure 07 and the reflective layer 08, the adhesion work Wa between the two may be improved to increase the thrust of the package structure 07, thereby further reducing the risk of peeling of the package structure 07. The adhesion work Wa may satisfy: Wa=r1+r2−r12.

r1 and r2 refer to respective interfacial tensions of the two-phase polymers, and r12 refers to a contact surface tension after the two-phase polymers come into contact. It can be seen from this formula that, in order to increase the adhesion work Wa of the two-phase polymers, the contact surface tension r12 may be reduced. The closer the physical and chemical properties of the two-phase polymers, the smaller the contact surface tension r12, and if the physical and chemical properties of the two-phase polymers are the same, the contact surface tension r12 may be 0, that is, the contact surface tension disappears, i.e., r1=r2. Based on this, the adhesion work Wa between the reflective layer 08 and each package structure 07 may be increased by allowing the physical and chemical properties of the reflective layer 08 and each package structure 07 to be as close or identical as possible.

Optionally, in an embodiment of the present disclosure, the material of the reflective layer 08 and the material of the package structures 07 may be provided as homogeneous materials. Here, the homogeneous materials refer to materials with the same or similar physical and chemical properties.

For example, in an embodiment of the present disclosure, silicone-based resin materials may be provided as the material of the reflective layer 08 and the material of the package structure 07. For instance, the material of the reflective layer 08 may be a silicone-based resin ink based on that the material of the reflective layer 08 is the white ink described in the above embodiment.

At present, the material of the reflective layer 08 is generally a fluorine-based resin material, and the material of the package structure 07 is generally a silicon-based resin material, and the physical and chemical properties of the reflective layer 08 and the package structure 07 are quite different, and the adhesion work Wa of the package structure 07 and the reflective layer 08 is small. However, in an embodiment of the present disclosure, the silicon-based resin material may also be provided as the material of the reflective layer 08 to allow the reflective layer 08 and the package structure 07 to be similar in the physical and chemical properties, thereby increasing the adhesion work Wa for the package structure 07 and the reflective layer 08.

Without doubt, in some other embodiments, it is also possible to improve the adhesion work Wa for the package structure 07 and the reflective layer 08 by providing the fluorine-based resin material as the material of the package structure 07, without changing the material of the reflectively layer 08.

Figure 15:
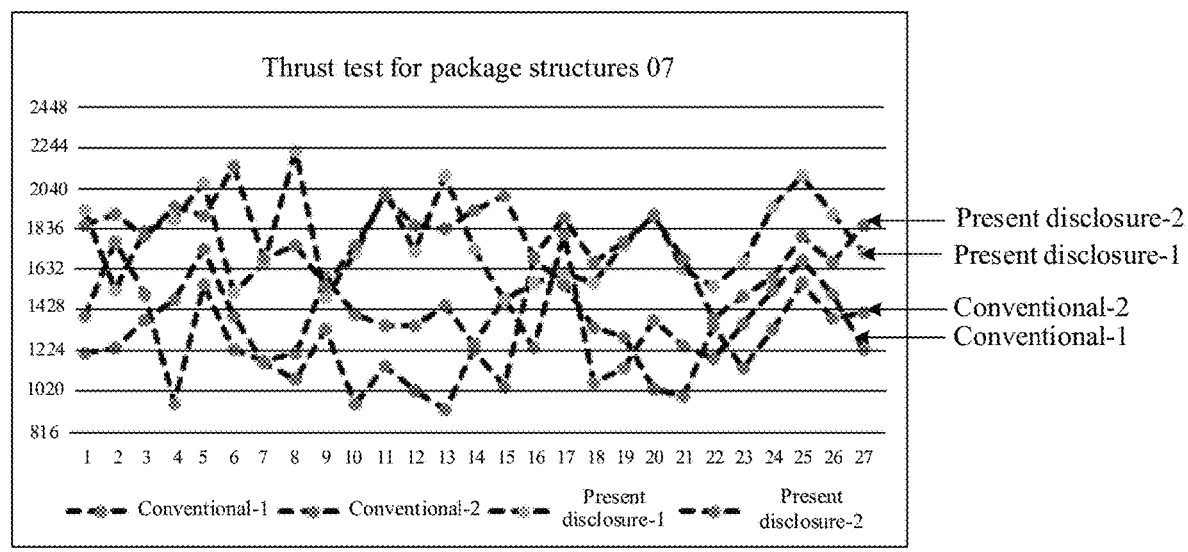
FIG. 15 is a schematic structural diagram of a thrust test for still another package structure according to an embodiment of the present disclosure.

, Exemplarily, still taking two backlight modules including a 34-inch substrate 01 and a curved back plate 03 with a radius of curvature of 1500 mm$^{-1}$ and the subregions in FIG. 9 as an example in an embodiment of the present disclosure, the thrusts of the package structures 07 before and after adjustment of the material are tested. FIG. 15 shows the test results and shows the thrust of the current package structure 07 in the 2 backlight modules where the reflective layer 08 and the package structures 07 are non-homogeneous materials, and the thrust of the package structure 07 in the 2 backlight modules where the reflective layer 08 and the package structures 07 are homogeneous materials according to the embodiment of the present disclosure, respectively. "-1" and "-2" in FIG. 15 represent two backlight modules, respectively. The x-coordinates indicate the positions of 27 sites. The y-coordinates indicate the thrusts in gf.

Referring to the test results shown in FIG. 15, it can be determined that, in the related art, the average thrust of the package structures 07 is about 1322 gf based on that the reflective layer 08 and the package structure 07 are non-homogeneous materials. After the material of the reflective layer 08 is replaced with the silicon-based resin material homogeneous with the material of each package structure 07 according to the embodiment of the present disclosure, the adhesion work between the reflective layer 08 and each package structure 07 is increased, such that the average thrust of the package structures 07 can be increased to 1778 gf. The thrust of the package structure 07 is increased by about 35%. Accordingly, the risk of peeling of the package structures 07 can be effectively reduced. That is, the embodiment of the present disclosure may also avoid peeling of the package structures 07 by allowing the material of the reflective layer 08 to be homogeneous with the material of the package structures 07. For each backlight module, the average here refers to a value acquired by dividing the sum of thrusts of the package structures 07 at 27 positions by 27.

Based on the description in the above embodiments, it can be seen that, compared with the related art, the embodiments of the present disclosure may alleviate the structural peeling problem in the backlight module by the following design methods.

(1) A plurality of drive circuit boards 05, for example, 4 PCBAs are added. In this way, the stress on each first connector 04 (for instance, COF) in the curved state can be reduced, and the bending radius of the first connector 04 can be reduced. Thus, the risk of peeling of the first connectors 04 is reduced.

(2) The arrangement fashion of the light-emitting units 02 is adjusted, for instance, the long edge of each light-emitting unit 02 is set to be perpendicular to the bonding edge. In this way, the stress on the electrode of each light-emitting unit 02 can be reduced when the back plate 03 is in the curved state, the thrust of the light-emitting unit 02 can be increased, and the risk of peeling of the package structures 07 (i.e., the protective adhesive layer) caused by electrode breakage can be reduced.

(3) The contact area between each package structure 07 and the substrate 01 is reduced, and/or the material of the package structures 07 is optimized. For instance, the contact diameter is set to 2 mm, and the material of the package structures 07 is set to the high-thixotropy protective adhesive material. In this way, the stress on the package structure 07 caused by the bending of the substrate 01 can be reduced, and the risk of peeling of the package structures 07 can be further reduced.

(4) The material of reflective layer 08 and the material of the package structure 07 are set to be homogeneous. For instance, the silicon-based resin material is provided for both the reflective layer 08 and the package structures 07. In this way, the contact surface tension between the reflective layer 08 and each package structure 07 can be reduced, and the adhesion work between the reflective layer 08 and each package structure 07 can be increased, thereby increasing the thrust of each package structure 07 to further reduce the risk of peeling of the package structures 07. Based on the risk reduced as above, the light-emitting units 02 can be avoided from turning off due to peeling, thereby improving the product yield of the backlight module.

Figure 16:
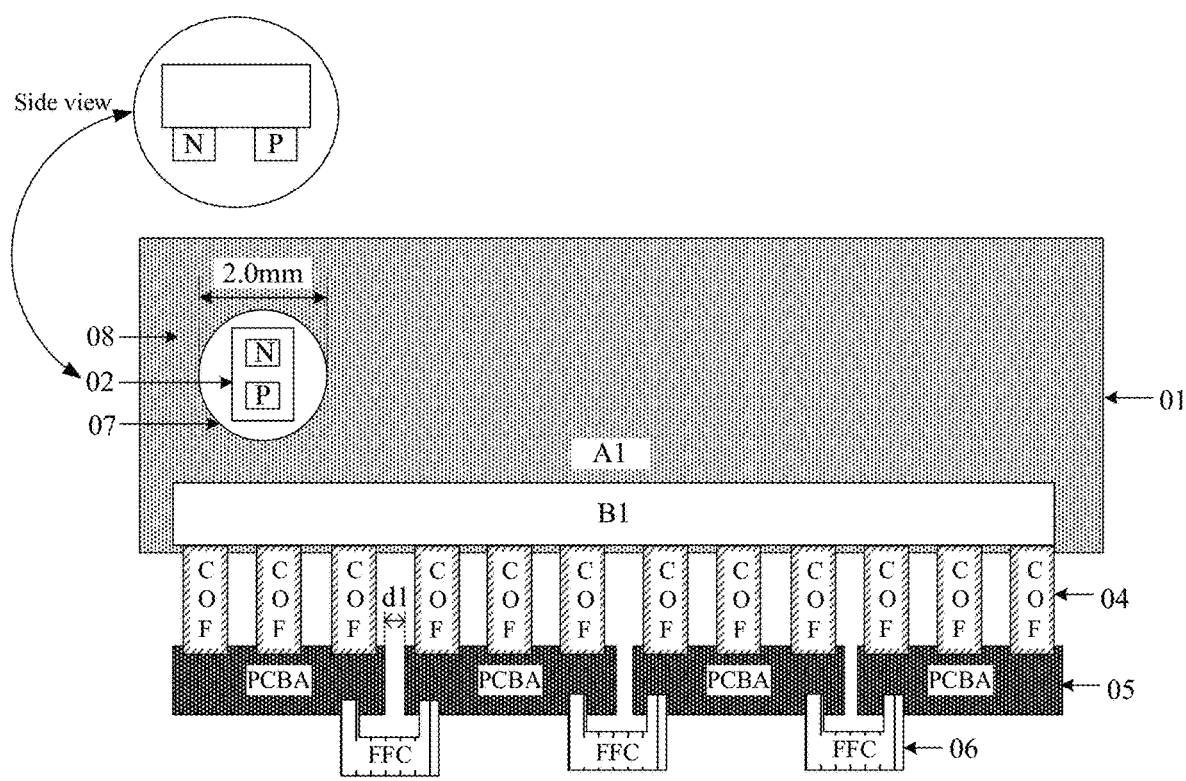
FIG. 16 is a schematic structural diagram of further another backlight module according to an embodiment of the present disclosure.

Exemplarily, taking the above 4 improvements as an example, FIG. 16 shows a schematic structural diagram of further another backlight module. Referring to FIG. 16, it can be seen that the backlight module described in an embodiment of the present disclosure may include a substrate 01 provided with a light-emitting region A1 and a bonding region B1. A reflective layer 08 is disposed on one side of the substrate 01 and provided with a plurality of openings (not shown in the figure). A plurality of light-emitting units 02 are disposed on one side of the substrate 01 and are in the light-emitting region A1 (only one is schematically shown in FIG. 16), and each light-emitting unit 02 is disposed in one opening K1 of the reflective layer 08. A plurality of package structures 07 are disposed on the side of the light-emitting units 02 further away from the substrate 01, and the edge of each package structure 07 is on the side of the reflective layer 08 further away from the substrate 01, and the package structure 07 covers a corresponding light-emitting unit 02 (the orthographic projection of the package structure 07 on the substrate 01 is only shown). At least three drive circuit boards 05 are bonded and connected to the bonding region B1 by a plurality of first connectors 04. Also, second connectors 06 are provided to couple every two adjacent drive circuit board 05.

Moreover, as shown in FIG. 16, each first connector 04 is a COF, each second connector 06 is an FFC, and each drive circuit board 05 is a PCBA. The package structure 07 has a hole diameter of 2.0 mm on the side closer to the substrate 01. The extension direction of the long edge of the light-emitting unit 02 and the bonding edge are perpendicular to each other. Each light-emitting unit 02 may include a positive electrode (P) and a negative electrode (N) which are arranged at interval. In order to allow the extension direction of the long edge and the bonding edge to be perpendicular to each other, the positive electrode P and the negative electrode N may be arranged in a first direction X1 at interval.

In summary, the embodiment of the present disclosure provides a backlight module. The backlight module includes a substrate provided with a light-emitting region and a bonding region, a plurality of light-emitting units disposed on a side of the substrate, a back plate disposed on the other side of the substrate, and at least three drive circuit boards bonded and connected to the bonding region by first connectors. Moreover, an extension direction of a long edge of each of the light-emitting units is not parallel to a bonding edge of the bonding region. Thus, in a case that the back plate is a curved back plate, the risk that the light-emitting units peel from the substrate when the back plate is in a curved state can be reduced by flexibly setting the degree of the included angle between the extension direction of the long edge of the light-emitting unit and the bonding edge of the bonding region, i.e., the arrangement fashion of the light-emitting units. Moreover, when the back plate is in the curved state, the risk that the first connectors peel from the bonding region, i.e., the risk that the drive circuit boards are disconnected from the bonding region, can be reduced by providing more drive circuit boards. Each structure in the backlight module provided in the embodiment of the present disclosure is not prone to peeling, and the product yield is improved.

Figure 17:
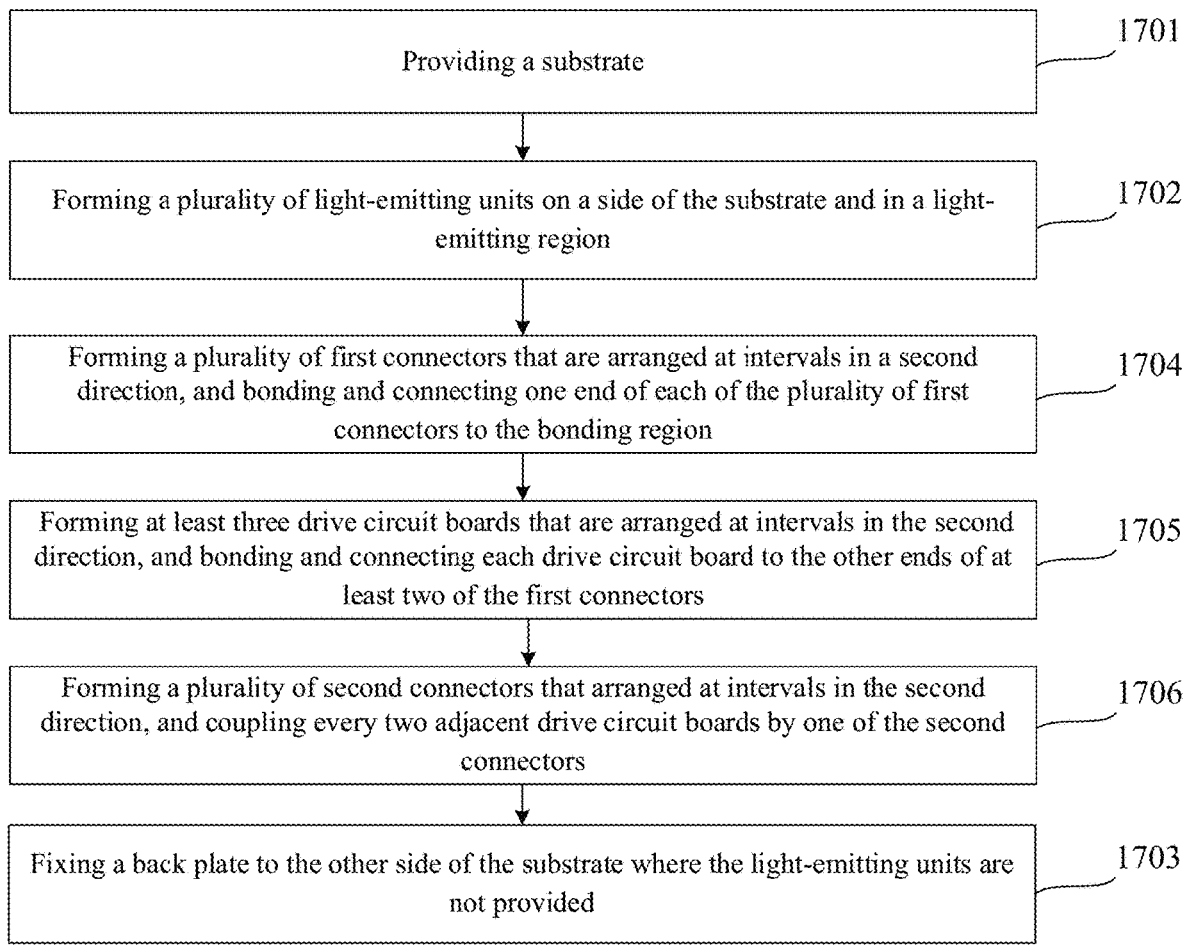
FIG. 17 is a flowchart of a method for manufacturing a backlight module according to an embodiment of the present disclosure.

FIG. 17 is a flowchart of a method for manufacturing a backlight module according to an embodiment of the present disclosure. The method can be used for manufacturing of the backlight module shown in the above figures. As shown in FIG. 17, the method may include the following steps.

In step 1701, a substrate is provided.

Optionally, referring to FIG. 1, the substrate 01 provided may be provided with a light-emitting region A1 and a bonding region B1, which are arranged sequentially in a first direction X1. Moreover, in an embodiment of the present disclosure, the substrate 01 provided may be a glass substrate. Without doubt, in some other embodiments, the substrate 01 provided may also be a flexible substrate, for instance, a substrate made of a flexible material polyimide.

In step 1702, a plurality of light-emitting units are formed on a side of the substrate and in a light-emitting region.

Optionally, still referring to FIG. 1, in an embodiment of the present disclosure, each light-emitting unit 02 formed is rectangular, and the orthographic projection of each light-emitting unit 02 on the substrate 01 may include two opposite long edges and two opposite short edges. Moreover, the extension direction Y1 of the long edge of each light-emitting unit 02 and the bonding edge may be intersected, i.e., unparallel. The bonding edge is a side edge of the substrate 01 where the bonding region B1 is provided. As can be seen from the descriptions of the above embodiments, the risk of peeling of the light-emitting units 02 and the package structures 07 can be reduced in such a configuration.

In step 1703, a back plate is fixed to the other side of the substrate where the light-emitting units are not disposed.

Optionally, referring to FIG. 2, a back plate 03 may be formed on the other side of the substrate 01 where the light-emitting units 02 are not provided. One side of the substrate 01 and the other side of the substrate 01 are opposite sides.

In step 1704, a plurality of first connectors that are arranged at intervals in a second direction are formed, and ends of a plurality of first connectors are bonded and connected to the bonding region.

Referring to FIG. 1, in the embodiment of the present disclosure, the second direction X2 and the first direction X1 may intersect. In an embodiment of the present disclosure, a plurality of first connectors 04 arranged at intervals in a second direction X2 may also be formed, and ends of a plurality of first connectors 04 are bonded and connected to the bonding region B1.

In step 1705, at least three drive circuit boards that are arranged at intervals in the second direction are formed, and each drive circuit board is bonded and connected to the other ends of at least two first connectors.

Optionally, referring to FIG. 1, in an embodiment of the present disclosure, three or more drive circuit boards 05 arranged in the second direction X2 at intervals may also be formed, and the at least three drive circuit boards 05 are bounded and connected to the other ends of the plurality of first connectors 04. Thus, the at least three drive circuit boards 05 are bonded and connected to the bonding region B1 by the plurality of first connectors 04. The at least three drive circuit boards 05 may transmit signals to the bonding region B1 to light up the plurality of light-emitting units 02 disposed on one side of the substrate 01. From the descriptions of the above embodiment, it can be seen that the provision of a large number of drive circuit boards 05 can reduce the risk of peeling of the first connectors 04, and can also reduce the length of each first connector 04 as well as the overall thickness of the backlight module.

In step 1706, a plurality of second connectors that arranged at intervals in the second direction are formed, and every two adjacent drive circuit boards are coupled by one of the second connectors.

Optionally, still referring to FIG. 1, in an embodiment of the present disclosure, a plurality of second connectors 06 arranged in the second direction X2 at intervals may also be formed to couple every two adjacent drive circuit boards 05, such that signal transmission can be achieved between the individual drive circuit board 05.

It should be noted that, as can be seen by referring to FIG. 17, the above step 1703 may be performed after steps 1704 to 1706 are performed in sequence. That is, in the end, the first connectors 04, the drive circuit boards 05, and the second connectors 06 are bent to the surface of the back plate 03 further away from the substrate 01, and then assembled with optical diaphragms, plastic frames and other components to form a backlight module.

In summary, the embodiment of the present disclosure provides a method for manufacturing a backlight module. In this method, the plurality of light-emitting elements may be formed on one side of the substrate, the back plate may be formed on the other side of the substrate, and the at least three drive circuit boards may be bonded and connected to the bonding region of the substrate by the first connectors. Moreover, the extension direction of each long edge of each formed light-emitting unit is not parallel to the bonding edge of the bonding region. Thus, in a case that the back plate is a curved back plate, the risk that the light-emitting units peel from the substrate when the back plate is in a curved state can be reduced by flexibly setting the degree of the included angle between the extension direction of the long edge of the light-emitting unit and the bonding edge of the bonding region, i.e., the arrangement fashion of the light-emitting units. Moreover, when the back plate is in the curved state, the risk that the first connectors peel from the bonding region, i.e., the risk that the drive circuit boards are disconnected from the bonding region, can be reduced by providing more drive circuit boards. Each structure in the backlight module manufactured with this method is not prone to peeling, and the product yield is improved.

It should be noted that a reference can be made to the descriptions of the above apparatus embodiments for the specific manufacturing method in each step, which will not be repeated here.

Figure 18:
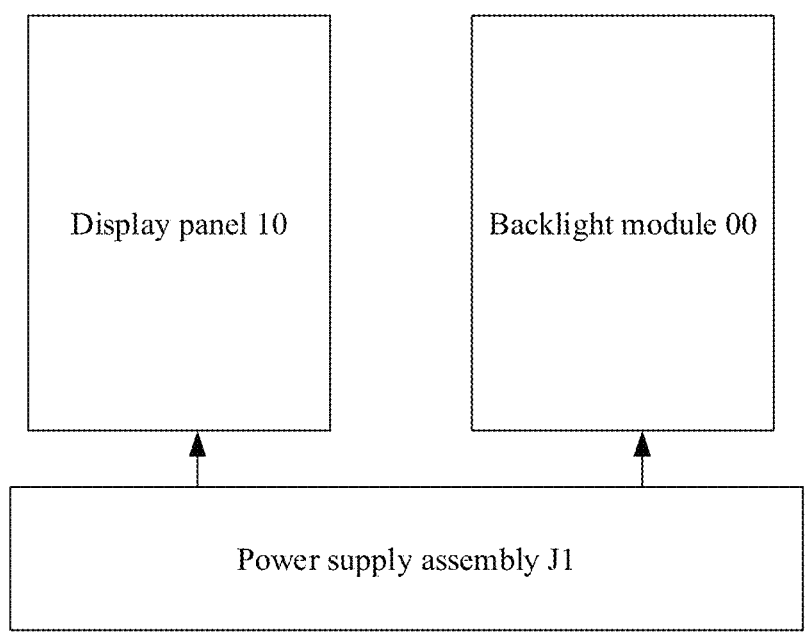
FIG. 18 is a schematic structural diagram of a display apparatus according to an embodiment of the present disclosure.

FIG. 18 is a schematic structural diagram of a display apparatus according to an embodiment of the present disclosure. As shown in FIG. 18, the display apparatus includes: a display panel 10, a power supply assembly J1, and the backlight module 00 provided in an embodiment of the present disclosure.

The power supply assembly J1 is coupled to the backlight module 00 and the display panel 10, respectively, and is configured to supply electrical signals to the two. Specifically, the display panel 10 may be a curved liquid crystal display panel having the same curvature as the back plate in the backlight module 00. The backlight module 00 may be configured to supply backlight to the display panel 10.

Optionally, the display apparatus may be a mobile phone, a tablet computer, a television, a display, a notebook computer, a digital photo frame, a navigator or a transparent display product, or any product or component having a display function.

It should be noted that in the drawings, the size of layers and regions may be exaggerated for clarity of illustration. Moreover, it should be understood that when an element or layer is referred to as being "on" another element or layer, the element or layer may be directly on the other element or an intervening layer may be present. In addition, it should be understood that when an element or layer is referred to as being "under" another element or layer, the element or layer may be directly under the other element, or more than one intervening layer or element may be present. In addition, it should be further understood that when a layer or element is referred to as being "between" two layers or two elements, the layer or element may be a unique layer between the two layers or two elements, or more than one intervening layer or element may be present. Similar reference signs indicate similar elements throughout the whole text.

Also, the terms used in the embodiment section of the present disclosure are only for the purpose of explaining the embodiments of the present disclosure, and are not intended to limit the present disclosure. Unless otherwise defined, the technical terms or scientific terms used in the embodiments of the present disclosure shall be taken to mean the ordinary meanings as understood by those of ordinary skills in the art to which the present disclosure belongs.

For instance, in the embodiments of the present disclosure, the terms "first" and "second" are for descriptive purposes only and shall not be construed as indicating or implying relative importance. The term "a plurality of" means two or more in number, unless otherwise stated.

Similarly, the terms "a", "an", or the like are also not intended to limit the number, but to denote the number of at least one.

The terms "include", "include", or the like are intended to mean that elements or objects appearing before said term cover elements or objects or equivalents listed after said term, but do not exclude other elements or objects.

The terms "up", "down", "left", "right", or the like are only used to indicate a relative positional relationship, and when the absolute position of a described object changes, the relative positional relationship thereof may also change accordingly. "Connection" or "coupling" refers to an electrical connection.

The term "and/or" indicates the presence of three types of possible relationships. For example, A and/or B may indicate the following three case: A exists alone; both A and B exist; or B exists alone. The character "/" generally indicates an "or" relation between front and back associated objects.

Described above are merely optional embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. A backlight module, comprising:
  a substrate, wherein the substrate is provided with a light-emitting region and a bonding region which are arranged sequentially in a first direction;
  a plurality of light-emitting units, wherein the plurality of light-emitting units are disposed on a side of the substrate and are in the light-emitting region, each of the plurality of light-emitting units is rectangular, an orthographic projection of each of the plurality of light-emitting units on the substrate comprises two opposite long edges and two opposite short edges, an extension direction of a long edge of each of the plurality of light-emitting units intersects with a bonding edge, which is a side edge of the substrate where the bonding region is provided;
  a back plate disposed on the other side of the substrate where the light-emitting units are not provided;
  a plurality of first connectors, wherein the plurality of first connectors are arranged at intervals in a second direction, one end of each of the plurality of first connectors is bonded and connected to the bonding region, and the second direction intersects with the first direction;
  at least three drive circuit boards, wherein the at least three drive circuit boards are arranged at intervals in the second direction, and each of the drive circuit boards is bonded and connected to the other ends of at least two of the plurality of first connectors; and
  a plurality of second connectors, wherein the plurality of second connectors are arranged at intervals in the second direction, and every two adjacent drive circuit boards are coupled by one of the plurality of second connectors.

2. The backlight module according to claim 1, wherein the back plate is a curved back plate, and a radius of curvature of the curved back plate is between 700 mm and 2000 mm.

3. The backlight module according to claim 1, wherein an orthographic projection of each of the plurality of light-emitting units on the substrate is rectangular, and the substrate is rectangular; and
  an included angle between the extension direction of the long edge of each of the plurality of light-emitting units and the bonding edge is greater than or equal to a target degree and is less than or equal to 90 degrees, and the target degree is a degree of an included angle between a diagonal of the rectangular substrate and the bonding edge.

4. The backlight module according to claim 3, wherein the included angle between the extension direction of the long edge of each of the plurality of light-emitting units and the bonding edge is 90 degrees, and the plurality of light-emitting units are arranged in an array.

5. The backlight module according to claim 1, wherein the at least three drive circuit boards are arranged at equal intervals.

6. The backlight module according to claim 1, wherein the bonding region is divided into at least three bonding subregions in the second direction; and
  Wherein a number of the bonding subregions is the same as a number of the at least three drive circuit boards, and each of the at least three drive circuit boards is bonded and connected to a corresponding bonding subregion by at least one of the plurality of first connectors.

7. The backlight module according to claim 1, wherein the backlight module comprises four drive circuit boards, and each of the four drive circuit boards is connected to a target number of adjacent first connectors connected to the bonding region, and the target number is greater than or equal to 1.

8. The backlight module according to claim 1, wherein the backlight module further comprises a plurality of package structures in one-to-one correspondence to the plurality of light-emitting units;

each of the plurality of package structures is disposed on a side of a corresponding light-emitting unit further away from the substrate and covers the light-emitting unit, and a length to height ratio of each of the plurality of package structures is greater than or equal to a first ratio and is less than or equal to a second ratio; and wherein an orthographic projection of each of the plurality of package structures on the substrate is circular, a length of each of the plurality of package structures is a diameter of a contact surface between the package structure and the substrate, and a height of each of the plurality of package structures is a distance between an apex of the package structure further away from the substrate and the substrate.

9. The backlight module according to claim 8, wherein the first ratio is 1 and the second ratio is 4.5.

10. The backlight module according to claim 9, wherein the length of each of the plurality of package structures is 2 mm, and the height of each of the plurality of package structures is 0.5 mm.

11. The backlight module according to claim 8, wherein a surface of the package structure further away from the substrate is an arc surface.

12. The backlight module according to claim 8, wherein a material of the plurality of package structures comprises a high-thixotropy protective adhesive material, and the material of the plurality of package structures is a transparent material.

13. The backlight module according to claim 8, wherein the backlight module further comprises a reflective layer;

the reflective layer is disposed on the side of the substrate and is provided with a plurality of openings in one-to-one correspondence to the plurality of light-emitting units, each of the plurality of light-emitting units is disposed in a corresponding opening, an orthographic projection of each of the plurality of openings on the substrate is disposed in an orthographic projection of one package structure on the substrate, and an edge of each of the plurality of package structures is disposed on a side of the reflective layer further away from the substrate; and wherein a material of the reflective layer and the material of the package structures are homogeneous materials.

14. The backlight module according to claim 13, wherein the material of the reflective layer and the material of the package structures are both silicon-based resin materials.

15. The backlight module according to claim 13, wherein the material of the reflective layer comprises white ink.

16. The backlight module according to claim 1, wherein the at least three drive circuit boards comprise a printed circuit board; the plurality of first connectors comprise a chip on film bonding member; and the plurality of second connectors comprise a flexible flat cable.

17. The backlight module according to claim 1, wherein the plurality of light-emitting units are submillimeter light-emitting diodes or micro light-emitting diodes.

18. The backlight module according to claim 1, wherein the first direction and the second direction are perpendicular to each other.

19. A method for manufacturing a backlight module, applied for manufacturing the backlight module according to claim 1, comprising:

providing a substrate, wherein the substrate is provided with a light-emitting region and a bonding region, which are arranged sequentially in a first direction;

forming a plurality of light-emitting units on a side of the substrate and in the light-emitting region, wherein each of the plurality of light-emitting units is rectangular, an orthographic projection of each of the plurality of light-emitting units on the substrate comprises two opposite long edges and two opposite short edges, and an extension direction of a long edge of each of the plurality of light-emitting units intersects with a bonding edge, which is a side edge of the substrate where the bonding region is provided;

fixing a back plate to the other side of the substrate where the plurality of light-emitting units are not provided;

forming a plurality of first connectors that are arranged at intervals in a second direction and bonding and connecting one end of each of the plurality of first connectors to the bonding region, wherein the second direction intersects with the first direction;

forming at least three drive circuit boards that are arranged at intervals in the second direction and bonding and connecting each of the at least three drive circuit boards to the other ends of at least two of the plurality of first connectors; and forming a plurality of second connectors that arranged at intervals in the second direction, and coupling every two adjacent drive circuit boards by one of the plurality of second connectors.

20. A display apparatus, comprising a power supply assembly, a display panel, and the backlight module according to claim 1, wherein the power supply assembly is coupled to the backlight module and the display panel, respectively.

* * * * *